United States Patent
Wu et al.

(10) Patent No.: US 11,330,610 B2
(45) Date of Patent: May 10, 2022

(54) DATA SENDING AND RECEIVING METHOD AND APPARATUS

(71) Applicant: HUAWEI TECHNOLOGIES CO., LTD., Guangdong (CN)

(72) Inventors: Zuomin Wu, Shenzhen (CN); Lei Guan, Beijing (CN); Sha Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/713,943

(22) Filed: Dec. 13, 2019

(65) Prior Publication Data

US 2020/0120693 A1 Apr. 16, 2020

Related U.S. Application Data

(63) Continuation of application No. PCT/CN2018/091887, filed on Jun. 19, 2018.

(30) Foreign Application Priority Data

Jun. 16, 2017 (CN) .......................... 201710459816.4
Aug. 11, 2017 (CN) .......................... 201710686573.8

(51) Int. Cl.
*H04W 4/00* (2018.01)
*H04W 72/12* (2009.01)

(52) U.S. Cl.
CPC .............................. *H04W 72/1263* (2013.01)

(58) Field of Classification Search
CPC ......... H04W 72/0453; H04W 72/0446; H04W 72/14; H04W 56/001; H04W 72/0493; H04W 72/04
See application file for complete search history.

(56) References Cited

U.S. PATENT DOCUMENTS

| 10,681,633 | B2* | 6/2020 | Ang .................. H04W 72/0446 |
| 2010/0189093 | A1 | 7/2010 | Palanki et al. |
| 2016/0302200 | A1* | 10/2016 | Yang ........................ H04L 5/001 |

(Continued)

FOREIGN PATENT DOCUMENTS

| CN | 101795457 A | 8/2010 |
| CN | 103222295 A | 7/2013 |

(Continued)

*Primary Examiner* — Khalid W Shaheed
(74) *Attorney, Agent, or Firm* — Womble Bond Dickinson (US) LLP

(57) ABSTRACT

A data sending and receiving method and apparatus are disclosed. The method includes: obtaining, by a first device, first data, where the first data includes data obtained after a first transport block is encoded, the first data includes at least two pieces of subdata, and the at least two pieces of subdata include first subdata and second subdata; determining, by the first device, a first time-frequency resource used to transmit the first data, where the first time-frequency resource occupies at least two subbands, and the at least two subbands include a first subband and a second subband; and sending, by the first device, the first subdata by using the first subband occupied by the first time-frequency resource, and sending, by the first device, the second subdata by using the second subband occupied by the first time-frequency resource.

16 Claims, 13 Drawing Sheets

(56) References Cited

U.S. PATENT DOCUMENTS

2017/0142702 A1    5/2017  Yu et al.
2017/0244535 A1*  8/2017  Islam .................... H04L 5/0028
2018/0049219 A1*  2/2018  Gupta .................... H04L 5/0041
2018/0070341 A1*  3/2018  Islam .................... H04L 1/1887

FOREIGN PATENT DOCUMENTS

| | | |
|---|---|---|
| CN | 104956634 A | 9/2015 |
| CN | 106712914 A | 5/2017 |
| EP | 3307004 A1 | 4/2018 |
| WO | 2017015785 A1 | 2/2017 |

\* cited by examiner

|   |   |   |   |   |   |   |
|---|---|---|---|---|---|---|
| 1 | 5 | 9 | 13 | 17 | 21 | 25 |
| 2 | 6 | 10 | 14 | 18 | 22 | 26 |
| 3 | 7 | 11 | 15 | 19 | 23 | 27 |
| 4 | 8 | 12 | 16 | 20 | 24 | 28 |
| 29 | 33 | 37 | 41 | 45 | 49 | 53 |
| 30 | 34 | 38 | 42 | 46 | 50 | 54 |
| 31 | 35 | 39 | 43 | 47 | 51 | 55 |
| 32 | 36 | 40 | 44 | 48 | 52 | 56 |

Subband 1 (rows 1–4), Subband 2 (rows 5–8)

Symbol →, Subcarrier ↓

☐ Sequence numbers of first subdata are 1 to 28, and sequence numbers of second subdata are 29 to 56

FIG. 6

DATA SENDING AND RECEIVING METHOD AND APPARATUS

CROSS-REFERENCE TO RELATED APPLICATIONS

This application is a continuation of International Application No. PCT/CN2018/091887, filed on Jun. 19, 2018, which claims priority to Chinese Patent Application No. 201710686573.8, filed on Aug. 11, 2017 and claims priority to Chinese Patent Application No. 201710459816.4, filed on Jun. 16, 2017. The disclosures of the aforementioned applications are hereby incorporated by reference in their entireties.

TECHNICAL FIELD

The present disclosure relates to the mobile communications field, and in particular, to a data sending and receiving method and apparatus.

BACKGROUND

In the existing wireless communications field, spectrum resources are mainly classified into two types. One type is a licensed spectrum resource, and the other type is a grant-free spectrum resource. The licensed spectrum resource is a spectrum resource that is designated by a radio regulation committee of a government for a special purpose, for example, a spectrum resource that is used by a mobile operator, or a spectrum resource that is exclusively used in civil aviation, railway, and police. Due to policy exclusiveness, service quality of the licensed spectrum resource can be generally ensured, and scheduling control can be relatively easily performed.

The grant-free spectrum resource is also a spectrum resource that is designated by a related department of a government. However, for the grant-free spectrum resource, a radio technology, an operation enterprise, and a service life are not limited, and in addition, service quality of the frequency band is not ensured. A communications device can use a grant-free spectrum resource for free provided that the communications device meets a requirement on an index such as transmit power or out-of-band leakage. Common communications systems that use a grant-free spectrum resource for communication include a civil walkie-talkie, a radio remote control, a WiFi system, a Bluetooth communications system, and the like.

When a communications device uses a grant-free spectrum resource for communication transmission, the communications device needs to comply with specifications formulated in various regions for use of the grant-free spectrum resource. For example, when various systems coexist on the grant-free spectrum resource, a problem of resource contention among different systems needs to be resolved. Therefore, some countries or regions specify that devices that use grant-free spectrum resources should comply with a resource contention method of listen before talk (LBT). To be specific, the device can send a signal only after detecting an idle channel.

With evolution of communications technologies, regardless of whether a spectrum is a licensed spectrum or a grant-free spectrum, a spectrum resource used to perform wireless communication in a communications system may be used in a manner of a large bandwidth. For example, a bandwidth of a carrier is 80 M. Because a system bandwidth on the carrier is large, a frequency resource of the carrier may be divided into a plurality of subbands. One physical channel may be transmitted on the plurality of subbands. When the physical channel is transmitted on the plurality of subbands, if an existing first-frequency-domain-then-time-domain mapping method is still used, the communications device needs to have a large-bandwidth processing capability, and therefore implementation complexity is increased. If an existing first-time-domain-then-frequency-domain mapping method is still used, the communications device needs to wait until an entire transmission period ends, and then starts to perform physical channel demodulation, and a processing latency is increased. Therefore, a new resource mapping method needs to be considered to send and receive the physical channel.

SUMMARY

This specification describes a data sending or receiving method and apparatus. In a wireless communications system, when a spectrum resource is used in a high bandwidth manner, a new resource mapping method is provided to send and receive data.

According to a first aspect, an embodiment of the present disclosure provides a data sending method, including: encoding, by a first device, a first transport block to obtain first data, where the first data includes at least two pieces of subdata, and the at least two pieces of subdata include first subdata and second subdata;

determining, by the first device, a first time-frequency resource used to transmit the first data, where the first time-frequency resource occupies at least two subbands, and the at least two subbands include a first subband and a second subband; and sending, by the first device, the first subdata by using the first subband occupied by the first time-frequency resource, and sending, by the first device, the second subdata by using the second subband occupied by the first time-frequency resource.

According to a second aspect, an embodiment of the present disclosure provides a data sending apparatus, including:

a code unit, configured to code a first transport block to obtain first data, where the first data includes at least two pieces of subdata, and the at least two pieces of subdata include first subdata and second subdata;

a processing unit, configured to determine a first time-frequency resource used to transmit the first data, where the first time-frequency resource occupies at least two subbands, and the at least two subbands include a first subband and a second subband; and a sending unit, configured to: send the first subdata by using the first subband occupied by the first time-frequency resource, and send the second subdata by using the second subband occupied by the first time-frequency resource.

According to a third aspect, an embodiment of the present disclosure provides a data receiving method, including:

determining, by a second device, a first time-frequency resource, where the first time-frequency resource occupies at least two subbands, and the at least two subbands include a first subband and a second subband;

receiving, by the second device, first data on the first time-frequency resource, where the first data includes at least two pieces of subdata, the at least two pieces of subdata include first subdata and second subdata, the second device receives the first subdata by using the first subband occupied by the first time-frequency resource, and the second device receives the second subdata by using the second subband occupied by the first time-frequency resource; and decoding, by the second device, the first data, to obtain a first transport block (TB).

According to a fourth aspect, an embodiment of the present disclosure provides a data receiving apparatus, including:

a processing unit, configured to determine a first time-frequency resource, where the first time-frequency resource occupies at least two subbands, and the at least two subbands include a first subband and a second subband;

a receiving unit, configured to receive first data on the first time-frequency resource, where the first data includes at least two pieces of subdata, the at least two pieces of subdata include first subdata and second subdata, the receiving unit receives the first subdata by using the first subband occupied by the first time-frequency resource, and receives the second subdata by using the second subband occupied by the first time-frequency resource; and a decoding unit, configured to decode the first data, to obtain a first transport block (TB).

According to the solution provided in the foregoing embodiments, when wireless communication is performed in the communications system by using a carrier with a large system bandwidth, a sending device (the first device) divides encoded data into a plurality of pieces of subdata, and respectively maps the plurality of pieces of subdata to a plurality of subbands for transmission to a receiving device (the second device). Therefore, a requirement posed on the sending device and/or the receiving device to have a high-bandwidth processing capability may be reduced, and implementation complexity is reduced.

In one embodiment, corresponding to the first aspect to the fourth aspect of the embodiments of the present disclosure, the first data obtained after the first transport block is encoded is divided to obtain the at least two pieces of subdata. A quantity of pieces of subdata included in the first data corresponds to a quantity of subbands occupied by the first time-frequency resource. For example, the quantity of pieces of subdata included in the first data is equal to the quantity of subbands occupied by the first time-frequency resource. Each piece of subdata is mapped and sent separately on one subband in a resource manner.

In one embodiment, corresponding to the first aspect of the embodiments of the present disclosure, the first device sends, based on a first-frequency-domain-then-time-domain mapping sequence, the first subdata by using the first subband occupied by the first time-frequency resource, and/or, the first device sends, based on a first-frequency-domain-then-time-domain mapping sequence, the second subdata by using the second subband occupied by the first time-frequency resource.

In one embodiment, corresponding to the second aspect of the embodiments of the present disclosure, the sending unit is configured to send, based on a first-frequency-domain-then-time-domain mapping sequence, the first subdata by using the first subband occupied by the first time-frequency resource, and/or, the sending unit is configured to send, based on a first-frequency-domain-then-time-domain mapping sequence, the second subdata by using the second subband occupied by the first time-frequency resource.

In one embodiment, corresponding to the third aspect of the embodiments of the present disclosure, the second device receives, based on a first-frequency-domain-then-time-domain sequence, the first subdata by using the first subband occupied by the first time-frequency resource, and/or, the second device receives, based on a first-frequency-domain-then-time-domain sequence, the second subdata by using the second subband occupied by the first time-frequency resource.

In one embodiment, corresponding to the fourth aspect of the embodiments of the present disclosure, the receiving unit receives, based on a first-frequency-domain-then-time-domain sequence, the first subdata by using the first subband occupied by the first time-frequency resource, and/or, the receiving unit receives, based on a first-frequency-domain-then-time-domain mapping sequence, the second subdata by using the second subband occupied by the first time-frequency resource.

In one embodiment, corresponding to the designs of the first aspect to the fourth aspect of the embodiments of the present disclosure, a priority of the first subdata is higher than that of the second subdata, or data importance of the first subdata is higher than that of the second subdata. In one embodiment, bits that can be used for decoding and recovering data and that are included in the first subdata are more than bits that can be used for decoding and recovering data and that are included in the second subdata. For example, system bits included in the first subdata are more than system bits included in the second subdata.

According to the solution provided in the foregoing embodiments, subdata of different priorities are transmitted on different subbands, so that the receiving device can preferentially process subdata with high priorities during processing, to reduce a processing latency during channel demodulation, and improve processing efficiency of the system.

In one embodiment, corresponding to the designs of the first aspect to the fourth aspect of the embodiments of the present disclosure, the first transport block includes a code block, the first subdata includes high-priority data obtained after the code block is encoded, and the second subdata includes low-priority data obtained after the code block is encoded, where the high-priority data includes data formed by continuous bit streams output first after the code block is encoded, and the low-priority data includes data formed by continuous bit streams output subsequently after the code block is encoded; or, a start location of the high-priority data is a preset location in the continuous bit streams after the code block is encoded.

In one embodiment, the preset location may be a start location of an RV 0, or a first bit in the bit streams, or another value.

In one embodiment, system bits included in the high-priority data are no fewer than system bits included in the low-priority data.

In one embodiment, in implementations of the first aspect to the fourth aspect of the embodiments of the present disclosure, at least one of the following cases is included:

a bit corresponding to a start location of the second subdata and a bit corresponding to an end location of the first subdata are continuous;

a start location of the first subdata and the start location of the second subdata respectively correspond to start locations of different redundancy versions RV of the first data; and bits included in the first subdata and bits included in the second subdata partially overlap.

In one embodiment, corresponding to the designs of the first aspect to the fourth aspect of the embodiments of the present disclosure, the first transport block includes a first code block group and a second code block group, the first code block group includes at least one code block, and the second code block group includes at least one code block; the first subdata includes first high-priority data obtained after the first code block group is encoded and second high-priority data obtained after the second code block group is encoded; and the second subdata includes first low-priority data obtained after the first code block group is encoded and second low-priority data obtained after the second code block group is encoded, where the first high-priority data includes data formed by continuous bit streams output first after the first code block group is encoded, the first low-priority data includes data formed by continuous bit streams output subsequently after the first code block group is encoded, the second high-priority data includes data formed by continuous bit streams output first after the second code block group is encoded, and the second low-priority data includes data formed by continuous bit streams output subsequently after the second code block group is encoded.

In one embodiment, a start location of the first high-priority data is a preset location in the continuous bit streams after the first code block group is encoded. In one embodiment, a start location of the second high-priority data is a preset location in the continuous bit streams after the second code block group is encoded. In one embodiment, the preset location may be a start location of an RV 0, or a first bit in the bit streams, or another value.

In one embodiment, system bits included in the first high-priority data are more than system bits included in the first low-priority data. In one embodiment, system bits included in the second high-priority data are more than system bits included in the second low-priority data.

In one embodiment, a size of the first high-priority data included in the first subdata or a size of the second high-priority data included in the first subdata is determined based on a size of a resource included in the first subband and a quantity of code block groups included in the first transport block; and/or, a size of the first low-priority data included in the second subdata or a size of the second low-priority data included in the second subdata is determined based on a size of a resource included in the second subband and a quantity of code block groups included in the first transport block.

In one embodiment, a size of the first high-priority data included in the first subdata or a size of the second high-priority data included in the first subdata is determined based on a size of a resource that is included in the first subband and that is of the first time-frequency resource and a quantity of code block groups included in the first transport block; and/or, a size of the first low-priority data included in the second subdata or a size of the second low-priority data included in the second subdata is determined based on a size of a resource that is included in the second subband and that is of the first time-frequency resource and a quantity of code block groups included in the first transport block.

In one embodiment, in the foregoing implementations, at least one of the following cases is included:

a bit corresponding to a start location of the first low-priority data and a bit corresponding to an end location of the first high-priority data are continuous;

a bit corresponding to a start location of the second low-priority data and a bit corresponding to an end location of the second high-priority data are continuous;

a start location of the first high-priority data and/or the start location of the first low-priority data respectively correspond to start locations of different redundancy versions RV of data obtained after the first code block group is encoded; and a start location of the second high-priority data and/or the start location of the second low-priority data respectively correspond to start locations of different redundancy versions RV of data obtained after the second code block group is encoded. In one embodiment, bits included in the first high-priority data and bits included in the first low-priority data partially overlap.

In one embodiment, bits included in the second high-priority data and bits included in the second low-priority data partially overlap.

In one embodiment, corresponding to the designs of the first aspect to the fourth aspect of the embodiments of the present disclosure, the first transport block includes at least a first code block group and a second code block group, the first code block group includes at least one code block, and the second code block group includes at least one code block; the first subdata includes data obtained after the first code block group is encoded and does not include data obtained after the second code block group is encoded, and the second subdata includes the data obtained after the second code block group is encoded and does not include the data obtained after the first code block group is encoded.

In one embodiment, a size of the data that is obtained after the first code block group is encoded and that is included in the first subdata is determined based on a size of a resource included in the first subband and a quantity of code block groups corresponding to the first subdata.

In one embodiment, a size of the data that is obtained after the second code block group is encoded and that is included in the second subdata is determined based on a size of a resource included in the second subband and a quantity of code block groups corresponding to the second subdata.

In one embodiment, a size of the data that is obtained after the first code block group is encoded and that is included in the first subdata is determined based on a size of a resource that is included in the first subband and that is of the first time-frequency resource and a quantity of code block groups corresponding to the first subdata.

In one embodiment, a size of the data that is obtained after the second code block group is encoded and that is included in the second subdata is determined based on a size of a resource that is included in the second subband and that is of the first time-frequency resource and a quantity of code block groups corresponding to the second subdata.

According to a fifth aspect, an embodiment of the present disclosure provides a data sending method, including:

determining, by a first device, a first time-frequency resource used to transmit first data, where the first time-frequency resource occupies at least two subbands in frequency domain, the at least two subbands include a first subband and a second subband, and the first data is data obtained after a first transport block is encoded;

determining, by the first device from the first time-frequency resource, a second time-frequency resource that can be used by the first device, where the second time-frequency resource occupies K of the at least two subbands in frequency domain, K≥1; and sending, by the first device, the first data by using the second time-frequency resource.

In this embodiment, during physical resource mapping, encoded modulation symbols are mapped in a first-frequency-domain-then-time-domain sequence in subbands.

An advantage of this is that, when the sending device can transmit only some of scheduled subbands, demodulation performance of data transmitted on the subbands can be ensured.

In one embodiment, the first data includes at least two pieces of subdata, and the at least two pieces of subdata include first subdata and second subdata; if the K subbands include the first subband and the second subband, the sending, by the first device, the first data by using the second time-frequency resource includes:

sending, by the first device, the first subdata by using the first subband occupied by the second time-frequency resource, and sending, by the first device, the second subdata by using the second subband occupied by the second time-frequency resource.

In one embodiment, the first data includes at least two pieces of subdata, and the at least two pieces of subdata include first subdata and second subdata;

if the K subbands include the first subband and do not include the second subband, the sending, by the first device, the first data by using the second time-frequency resource includes:

sending, by the first device, the first subdata by using the first subband occupied by the second time-frequency resource; and/or, if the K subbands include the second subband and do not include the first subband, the sending, by the first device, the first data by using the second time-frequency resource includes:

sending, by the first device, the first subdata by using the second subband occupied by the second time-frequency resource.

In one embodiment, if the K subbands include the second subband and do not include the first subband, the method further includes:

discarding, by the first device, the second subdata; or, sending, by the first device, the second subdata by using a third subband that is further included in the K subbands and that is occupied by the second time-frequency resource.

In one embodiment, the first data includes the at least two pieces of subdata, and the at least two pieces of subdata include the first subdata and the second subdata; the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In one embodiment, if the K subbands include the first subband and do not include the second subband, the sending, by the first device, the first data by using the second time-frequency resource includes:

sending, by the first device, the first subdata by using the first subband occupied by the second time-frequency resource;

and/or, if the K subbands include the second subband and do not include the first subband, the sending, by the first device, the first data by using the second time-frequency resource includes:

sending, by the first device, the second subdata by using the second subband occupied by the second time-frequency resource; or, sending, by the first device, the first subdata by using the second subband occupied by the second time-frequency resource, where the first subdata further includes control information or data of URLLC.

In one embodiment, the first transport block includes at least one of a transport block 1, a transport block 2, and a transport block 3. The transport block 1 is a control information transport block. The transport block 2 is a transport block of URLLC data. The transport block 3 is a transport block of a common data service. The transport block 1, the transport block 2, or the transport block 3 each includes at least one transport block. In one embodiment, the first subdata and the second subdata include bits obtained after a transport block, for example, the transport block 1 (or the transport block 2, or the transport block 3) is encoded. The first subdata includes data formed by continuous bit streams output first after the transport block 1 (or the transport block 2, or the transport block 3) is encoded. The second subdata includes data formed by continuous bit streams output subsequently after the transport block 1 (or the transport block 2, or the transport block 3) is encoded. In one embodiment, the first subdata includes bits obtained after the transport block 1 (and/or the transport block 2) are/is encoded, and the second subdata includes bits obtained after the transport block 3 is encoded. In one embodiment, the first subdata includes bits obtained after the transport block 1 (and/or the transport block 2) are/is encoded and data formed by continuous bit streams output first after the transport block 3 is encoded, and the second subdata includes data formed by continuous bit streams output subsequently after the transport block 3 is encoded. In one embodiment, the first subdata includes data formed by continuous bit streams output first after the transport block 1 is encoded, and/or data formed by continuous bit streams output first after the transport block 2 is encoded, and/or data formed by continuous bit streams output first after the transport block 3 is encoded, and the second subdata includes continuous bit streams output subsequently after the transport block 1 is encoded, and/or data formed by continuous bit streams output subsequently after the transport block 2 is encoded, and/or data formed by continuous bit streams output subsequently after the transport block 3 is encoded. In one embodiment, the first subdata includes bits obtained after the transport block 2 is encoded, and the second subdata includes bits obtained after the transport block 1 is encoded. In one embodiment, the first subdata includes bits obtained after the transport block 1 is encoded, and the second subdata includes bits obtained after the transport block 2 is encoded.

In one embodiment, the first transport block including at least one of the transport block 1, the transport block 2, and the transport block 3 may be divided into at least two CBGs.

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the first time-frequency resource (or in other words, a resource occupied by the first time-frequency resource in N subbands).

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the second time-frequency resource (or in other words, a resource occupied by the second time-frequency resource in K subbands).

In one embodiment, the method further includes:

sending, by the first device, at least one type of the following information by using the second time-frequency resource:

the control information; and the data of the URLLC.

According to a sixth aspect, an embodiment of the present disclosure provides a data receiving method, including:

determining, by a second device from a first time-frequency resource, a second time-frequency resource used by the second device to receive data, where the first time-frequency resource occupies at least two subbands in frequency domain, and the second time-frequency resource occupies K of the at least two subbands in frequency domain, K≥1;

receiving, by the second device, the first data on the K subbands occupied by the second time-frequency resource; and decoding, by the second device, the first data, to obtain a first transport block (TB).

In one embodiment, the at least two subbands include a first subband and a second subband, the first data includes at least two pieces of subdata, and the at least two pieces of subdata include first subdata and second subdata; and if the K subbands include the first subband and the second subband, the receiving, by the second device, the first data on the K subbands occupied by the second time-frequency resource includes:

receiving, by the second device, the first subdata by using the first subband occupied by the second time-frequency resource, and receiving, by the second device, the second subdata by using the second subband occupied by the second time-frequency resource.

In one embodiment, the at least two subbands include the first subband and the second subband, the first data includes the at least two pieces of subdata, and the at least two pieces of subdata include the first subdata and the second subdata, where if the K subbands include the first subband and do not include the second subband, the receiving, by the second device, the first data on the K subbands occupied by the second time-frequency resource includes:

receiving, by the second device, the first subdata by using the first subband occupied by the second time-frequency resource; and/or, if the K subbands include the second subband and do not include the first subband, the receiving, by the second device, the first data on the K subbands occupied by the second time-frequency resource includes:

receiving, by the second device, the first subdata by using the second subband occupied by the second time-frequency resource.

In one embodiment, if the K subbands include the second subband and do not include the first subband, the method further includes:

receiving, by the second device, the second subdata by using a third subband that is further included in the K subbands and that is occupied by the second time-frequency resource.

In one embodiment, the at least two subbands include the first subband and the second subband, the first data includes the at least two pieces of subdata, and the at least two pieces of subdata include the first subdata and the second subdata; the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In one embodiment, if the K subbands include the first subband and do not include the second subband, the receiving, by the second device, the first data on the K subbands occupied by the second time-frequency resource includes:

receiving, by the second device, the first subdata by using the first subband occupied by the second time-frequency resource;

and/or, if the K subbands include the second subband and do not include the first subband, the receiving, by the second device, the first data on the K subbands occupied by the second time-frequency resource includes:

receiving, by the second device, the second subdata by using the second subband occupied by the second time-frequency resource; or, receiving, by the second device, the first subdata by using the second subband occupied by the second time-frequency resource, where the first subdata further includes control information or data of URLLC.

In one embodiment, the first transport block includes at least one of a transport block 1, a transport block 2, and a transport block 3. The transport block 1 is a control information transport block. The transport block 2 is a transport block of URLLC data. The transport block 3 is a transport block of a common data service. The transport block 1, the transport block 2, or the transport block 3 each includes at least one transport block. In one embodiment, the first subdata and the second subdata include bits obtained after a transport block, for example, the transport block 1 (or the transport block 2, or the transport block 3) is encoded. The first subdata includes data formed by continuous bit streams output first after the transport block 1 (or the transport block 2, or the transport block 3) is encoded. The second subdata includes data formed by continuous bit streams output subsequently after the transport block 1 (or the transport block 2, or the transport block 3) is encoded. In one embodiment, the first subdata includes bits obtained after the transport block 1 (and/or the transport block 2) are/is encoded, and the second subdata includes bits obtained after the transport block 3 is encoded. In one embodiment, the first subdata includes bits obtained after the transport block 1 (and/or the transport block 2) are/is encoded and data formed by continuous bit streams output first after the transport block 3 is encoded, and the second subdata includes data formed by continuous bit streams output subsequently after the transport block 3 is encoded. In one embodiment, the first subdata includes data formed by continuous bit streams output first after the transport block 1 is encoded, and/or data formed by continuous bit streams output first after the transport block 2 is encoded, and/or data formed by continuous bit streams output first after the transport block 3 is encoded, and the second subdata includes continuous bit streams output subsequently after the transport block 1 is encoded, and/or data formed by continuous bit streams output subsequently after the transport block 2 is encoded, and/or data formed by continuous bit streams output subsequently after the transport block 3 is encoded. In one embodiment, the first subdata includes bits obtained after the transport block 2 is encoded, and the second subdata includes bits obtained after the transport block 1 is encoded. In one embodiment, the first subdata includes bits obtained after the transport block 1 is encoded, and the second subdata includes bits obtained after the transport block 2 is encoded.

In one embodiment, the first transport block including at least one of the transport block 1, the transport block 2, and the transport block 3 may be divided into at least two CBGs.

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the first time-frequency resource (or in other words, a resource occupied by the first time-frequency resource in N subbands).

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the second time-frequency resource (or in other words, a resource occupied by the first time-frequency resource in K subbands).

In one embodiment, the method further includes:
receiving, by the second device, at least one type of the following information by using the K subbands occupied by the second time-frequency resource:
the control information; and the data of the URLLC.

According to a seventh aspect, an embodiment of the present disclosure provides a data sending apparatus, including:
a determining unit, configured to determine a first time-frequency resource used to transmit first data, where the first time-frequency resource occupies at least two subbands in frequency domain, the at least two subbands include a first subband and a second subband, and the first data is data obtained after a first transport block is encoded;
a detection unit, configured to determine, from the first time-frequency resource, a second time-frequency resource that can be used, where the second time-frequency resource occupies K of the at least two subbands in frequency domain, K≥1; and
a sending unit, configured to send the first data by using the second time-frequency resource.

In one embodiment, the first data includes at least two pieces of subdata, and the at least two pieces of subdata include first subdata and second subdata; and if the K subbands include the first subband and the second subband, the sending unit is configured to: send the first subdata by using the first subband occupied by the second time-frequency resource, and send the second subdata by using the second subband occupied by the second time-frequency resource.

In one embodiment, the first data includes at least two pieces of subdata, and the at least two pieces of subdata include first subdata and second subdata;
if the K subbands include the first subband and do not include the second subband, the sending unit is configured to send the first subdata by using the first subband occupied by the second time-frequency resource; and/or,
if the K subbands include the second subband and do not include the first subband, the sending unit is configured to send the first subdata by using the second subband occupied by the second time-frequency resource.

In one embodiment, if the K subbands include the second subband and do not include the first subband, the first device discards the second subdata; or,
the sending unit is further configured to send the second subdata by using the third subband occupied by the second time-frequency resource.

In one embodiment, the first data includes the at least two pieces of subdata, and the at least two pieces of subdata include the first subdata and the second subdata; the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In one embodiment, if the K subbands include the first subband and do not include the second subband, the sending unit is configured to send the first subdata by using the first subband occupied by the second time-frequency resource; and/or
if the K subbands include the second subband and do not include the first subband, the sending unit is configured to send the second subdata by using the second subband occupied by the second time-frequency resource; or, the sending unit is configured to send the first subdata by using the second subband occupied by the second time-frequency resource, where the first subdata further includes control information or data of URLLC.

In one embodiment, the first transport block includes at least one of a transport block 1, a transport block 2, and a transport block 3. The transport block 1 is a control information transport block. The transport block 2 is a transport block of URLLC data. The transport block 3 is a transport block of a common data service. The transport block 1, the transport block 2, or the transport block 3 each includes at least one transport block. In one embodiment, the first subdata and the second subdata include bits obtained after a transport block, for example, the transport block 1 (or the transport block 2, or the transport block 3) is encoded. The first subdata includes data formed by continuous bit streams output first after the transport block 1 (or the transport block 2, or the transport block 3) is encoded. The second subdata includes data formed by continuous bit streams output subsequently after the transport block 1 (or the transport block 2, or the transport block 3) is encoded. In one embodiment, the first subdata includes bits obtained after the transport block 1 (and/or the transport block 2) are/is encoded, and the second subdata includes bits obtained after the transport block 3 is encoded. In one embodiment, the first subdata includes bits obtained after the transport block 1 (and/or the transport block 2) are/is encoded and data formed by continuous bit streams output first after the transport block 3 is encoded, and the second subdata includes data formed by continuous bit streams output subsequently after the transport block 3 is encoded. In one embodiment, the first subdata includes data formed by continuous bit streams output first after the transport block 1 is encoded, and/or data formed by continuous bit streams output first after the transport block 2 is encoded, and/or data formed by continuous bit streams output first after the transport block 3 is encoded, and the second subdata includes continuous bit streams output subsequently after the transport block 1 is encoded, and/or data formed by continuous bit streams output subsequently after the transport block 2 is encoded, and/or data formed by continuous bit streams output subsequently after the transport block 3 is encoded. In one embodiment, the first subdata includes bits obtained after the transport block 2 is encoded, and the second subdata includes bits obtained after the transport block 1 is encoded. In one embodiment, the first subdata includes bits obtained after the transport block 1 is encoded, and the second subdata includes bits obtained after the transport block 2 is encoded.

In one embodiment, the first transport block including at least one of the transport block 1, the transport block 2, and the transport block 3 may be divided into at least two CBGs.

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the first time-frequency resource (or in other words, a resource occupied by the first time-frequency resource in N subbands).

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the second time-frequency resource (or in other words, a resource occupied by the first time-frequency resource in K subbands).

In one embodiment, the sending unit is further configured to send at least one type of the following information by using the second time-frequency resource:
the control information; and the data of the URLLC.

According to an eighth aspect, an embodiment of the present disclosure provides a data receiving apparatus, including:

a detection unit, configured to determine, from a first time-frequency resource, a second time-frequency resource used to receive data, where the first time-frequency resource occupies at least two subbands in frequency domain, and the second time-frequency resource occupies K of the at least two subbands in frequency domain, K≥1;

a receiving unit, configured to receive the first data on the K subbands occupied by the second time-frequency resource; and a decoding unit, configured to decode the first data to obtain a first transport block (TB).

In one embodiment, the at least two subbands include a first subband and a second subband, the first data includes at least two pieces of subdata, and the at least two pieces of subdata include first subdata and second subdata; and if the K subbands include the first subband and the second subband, the receiving unit is configured to: receive the first subdata by using the first subband occupied by the second time-frequency resource, and receive the second subdata by using the second subband occupied by the second time-frequency resource.

In one embodiment, the at least two subbands include the first subband and the second subband, the first data includes the at least two pieces of subdata, and the at least two pieces of subdata include the first subdata and the second subdata, where if the K subbands include the first subband and do not include the second subband, the receiving unit is configured to receive the first subdata by using the first subband occupied by the second time-frequency resource; and/or, if the K subbands include the second subband and do not include the first subband, the receiving unit is configured to receive the first subdata by using the second subband occupied by the second time-frequency resource.

In one embodiment, if the K subbands include the second subband and do not include the first subband, the K subbands further include a third subband, and the receiving unit is further configured to receive the second subdata by using the third subband occupied by the second time-frequency resource.

In one embodiment, the at least two subbands include the first subband and the second subband, the first data includes the at least two pieces of subdata, and the at least two pieces of subdata include the first subdata and the second subdata; the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In one embodiment, if the K subbands include the first subband and do not include the second subband, the receiving unit is configured to receive the first subdata by using the first subband occupied by the second time-frequency resource;

and/or, if the K subbands include the second subband and do not include the first subband, the receiving unit is configured to receive the second subdata by using the second subband occupied by the second time-frequency resource; or, the receiving unit is configured to receive the first subdata by using the second subband occupied by the second time-frequency resource, where the first subdata further includes control information or data of URLLC.

In one embodiment, the first transport block includes at least one of a transport block 1, a transport block 2, and a transport block 3. The transport block 1 is a control information transport block. The transport block 2 is a transport block of URLLC data. The transport block 3 is a transport block of a common data service. The transport block 1, the transport block 2, or the transport block 3 each includes at least one transport block. In one embodiment, the first subdata and the second subdata include bits obtained after a transport block, for example, the transport block 1 (or the transport block 2, or the transport block 3) is encoded. The first subdata includes data formed by continuous bit streams output first after the transport block 1 (or the transport block 2, or the transport block 3) is encoded. The second subdata includes data formed by continuous bit streams output subsequently after the transport block 1 (or the transport block 2, or the transport block 3) is encoded. In one embodiment, the first subdata includes bits obtained after the transport block 1 (and/or the transport block 2) are/is encoded, and the second subdata includes bits obtained after the transport block 3 is encoded. In one embodiment, the first subdata includes bits obtained after the transport block 1 (and/or the transport block 2) are/is encoded and data formed by continuous bit streams output first after the transport block 3 is encoded, and the second subdata includes data formed by continuous bit streams output subsequently after the transport block 3 is encoded. In one embodiment, the first subdata includes data formed by continuous bit streams output first after the transport block 1 is encoded, and/or data formed by continuous bit streams output first after the transport block 2 is encoded, and/or data formed by continuous bit streams output first after the transport block 3 is encoded, and the second subdata includes continuous bit streams output subsequently after the transport block 1 is encoded, and/or data formed by continuous bit streams output subsequently after the transport block 2 is encoded, and/or data formed by continuous bit streams output subsequently after the transport block 3 is encoded. In one embodiment, the first subdata includes bits obtained after the transport block 2 is encoded, and the second subdata includes bits obtained after the transport block 1 is encoded. In one embodiment, the first subdata includes bits obtained after the transport block 1 is encoded, and the second subdata includes bits obtained after the transport block 2 is encoded.

In one embodiment, the first transport block including at least one of the transport block 1, the transport block 2, and the transport block 3 may be divided into at least two CBGs.

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the first time-frequency resource (or in other words, a resource occupied by the first time-frequency resource in N subbands).

In one embodiment, when at least one of the at least two pieces of subdata includes bits obtained after the control information is encoded, a quantity of resources used to transmit the bits obtained after the control information is encoded is determined based on a time domain resource and/or a frequency domain resource in the second time-frequency resource (or in other words, a resource occupied by the first time-frequency resource in K subbands).

In one embodiment, the receiving unit is further configured to receive at least one type of the following information by using the K subbands occupied by the second time-frequency resource:

the control information; and the data of the URLLC.

In one embodiment, corresponding to the fifth aspect to the eighth aspect of the embodiments of the present disclosure, a priority of the first subdata is higher than that of the second subdata. The priority of the first subdata is higher than that of the second subdata, or data importance of the first subdata is higher than that of the second subdata. In one embodiment, bits that can be used for decoding and recovering data and that are included in the first subdata are more than bits that can be used for decoding and recovering data and that are included in the second subdata. For example, system bits included in the first subdata are more than system bits included in the second subdata.

In the foregoing embodiments, the first data is sent on a time-frequency resource that can be used by the first device. To be specific, high-priority or high-importance data is sent on a subband in which LBT detection succeeds in a grant-free spectrum resource, and the second device may receive and process the data, to improve data processing efficiency.

In one embodiment, the first data includes the at least two pieces of subdata, and the at least two pieces of subdata include the first subdata and the second subdata; the first transport block includes a code block, the first subdata includes high-priority data obtained after the code block is encoded, and the second subdata includes low-priority data obtained after the code block is encoded, where the high-priority data includes data formed by continuous bit streams output first after the code block is encoded, and the low-priority data includes data formed by continuous bit streams output subsequently after the code block is encoded.

In one embodiment, a start location of the high-priority data is a preset location in the continuous bit streams after the code block is encoded. In one embodiment, the preset location may be a start location of an RV 0, or a first bit in the bit streams, or another value.

In one embodiment, system bits included in the high-priority data are no fewer than system bits included in the low-priority data.

In one embodiment, in implementations of the fifth aspect to the eighth aspect of the embodiments of the present disclosure, at least one of the following cases is included:

a bit corresponding to a start location of the second subdata and a bit corresponding to an end location of the first subdata are continuous;

a start location of the first subdata and the start location of the second subdata respectively correspond to start locations of different redundancy versions RV of the first data; and bits included in the first subdata and bits included in the second subdata partially overlap.

In one embodiment, the first data includes the at least two pieces of subdata, and the at least two pieces of subdata include the first subdata and the second subdata; the first transport block includes a first code block group and a second code block group, the first code block group and the second code block group each include at least one code block, the first subdata includes first high-priority data obtained after the first code block group is encoded and second high-priority data obtained after the second code block group is encoded, and the second subdata includes first low-priority data obtained after the first code block group is encoded and second low-priority data obtained after the second code block group is encoded, where the first high-priority data includes data formed by continuous bit streams output first after the first code block group is encoded, the first low-priority data includes data formed by continuous bit streams output subsequently after the first code block group is encoded, the second high-priority data includes data formed by continuous bit streams output first after the second code block group is encoded, and the second low-priority data includes data formed by continuous bit streams output subsequently after the second code block group is encoded.

In one embodiment, a start location of the first high-priority data is a preset location in the continuous bit streams after the first code block group is encoded. In one embodiment, a start location of the second high-priority data is a preset location in the continuous bit streams after the second code block group is encoded. In one embodiment, the preset location may be a start location of an RV 0, or a first bit in the bit streams, or another value.

In one embodiment, system bits included in the first high-priority data are more than system bits included in the first low-priority data. In one embodiment, system bits included in the second high-priority data are more than system bits included in the second low-priority data.

In one embodiment, a size of the first high-priority data included in the first subdata or a size of the second high-priority data included in the first subdata is determined based on a size of a resource included in the first subband and a quantity of code block groups included in the first transport block; and/or, a size of the first low-priority data included in the second subdata or a size of the second low-priority data included in the second subdata is determined based on a size of a resource included in the second subband and a quantity of code block groups included in the first transport block.

In one embodiment, in the foregoing implementations, at least one of the following cases is included:

a bit corresponding to a start location of the first low-priority data and a bit corresponding to an end location of the first high-priority data are continuous;

a bit corresponding to a start location of the second low-priority data and a bit corresponding to an end location of the second high-priority data are continuous;

a start location of the first high-priority data and/or the start location of the first low-priority data respectively correspond to start locations of different redundancy versions RV of data obtained after the first code block group is encoded; and a start location of the second high-priority data and/or the start location of the second low-priority data respectively correspond to start locations of different redundancy versions RV of data obtained after the second code block group is encoded.

In one embodiment, bits included in the first high-priority data and bits included in the first low-priority data partially overlap.

In one embodiment, bits included in the second high-priority data and bits included in the second low-priority data partially overlap.

According to another aspect, an embodiment of the present disclosure provides a communications system, where the system includes the data sending apparatus and the data receiving apparatus in the foregoing aspects.

Still another aspect of the present disclosure provides a computer-readable storage medium. The computer-readable storage medium stores an instruction. When the instruction is run on a computer, the computer is enabled to perform the method according to the foregoing aspects.

Still another aspect of the present disclosure provides a computer program product including an instruction. When the instruction is run on a computer, the computer is enabled to perform the methods according to the foregoing aspects.

BRIEF DESCRIPTION OF DRAWINGS

FIG. 6 is a schematic diagram of a data mapping method based on subbands according to the present disclosure;

DESCRIPTION OF EMBODIMENTS

Figure 1:
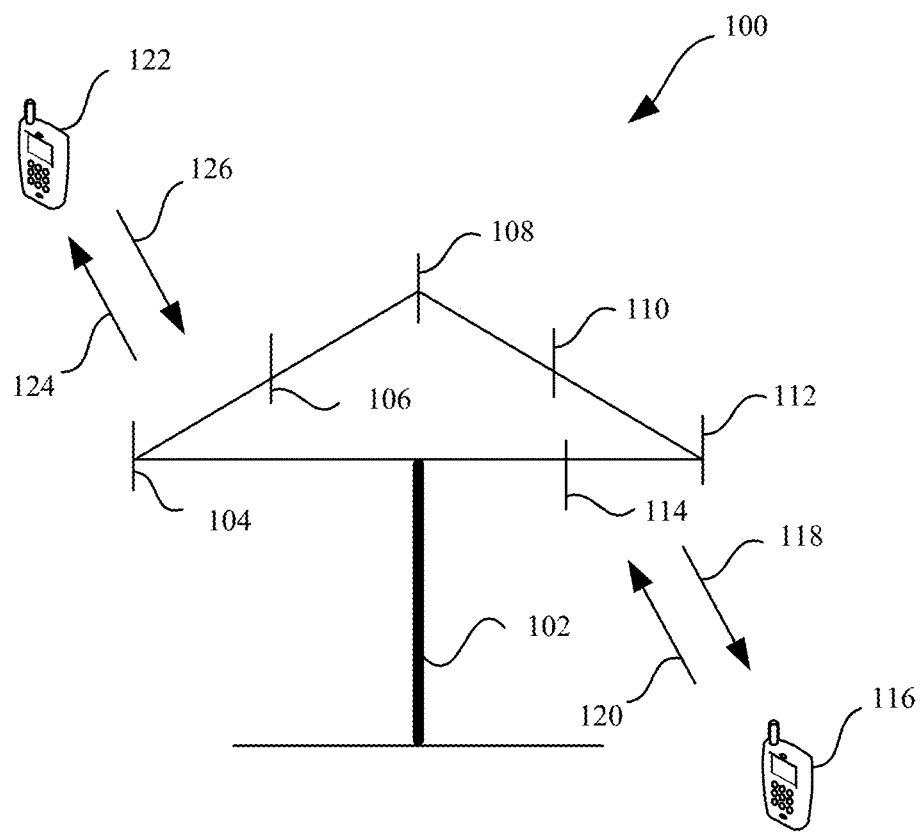
FIG. 1 is a schematic diagram of a possible application scenario according to the present disclosure.

The following describes technical solutions in embodiments of the present disclosure with reference to accompanying drawings.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the Internet interacting with other systems by using the signal).

It should be understood that, the embodiments of the present disclosure may be applied to various communications system, for example, a global system for mobile communications (GSM), a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunication system (UMTS), a wireless local area network (WLAN) system, a wireless fidelity (WiFi) system, or a next-generation new radio (NR) communications system.

Usually, a connection quantity supported by a conventional communications system is limited, and is easy to implement. However, with development of communications technologies, a mobile communications system not only supports conventional communication, but also supports, for example, device-to-device (D2D) communication, machine-to-machine (M2M) communication, machine type communication (MTC), and vehicle to vehicle (V2V) communication.

The embodiments of the present disclosure are described with reference to an access network device and a terminal device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in WLAN, a cellular phone, a cordless phone, a Session Initiation Protocol (SIP) phone, a wireless local loop (WLL) station, a personal digital assistant (PDA) device, a handheld device having a wireless communication function, a computing device or another processing device connected to a wireless modem, an in-vehicle device, a wearable device, a terminal device in a future 5G network, or a terminal device in a future evolved public land mobile network (PLMN).

By way of example and not limitation, in the embodiments of the present disclosure, the terminal device may also be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelry for vital sign monitoring.

In addition, the access network device may be a device such as a network device, configured to communicate with a mobile device. The access network device may be configured to provide a wireless communication function for the terminal device. The access network device may include a macro base station, a micro base station (also referred to as a small cell), a relay station, an access point, and the like in various forms. The access network device may be an access point (AP) in a WLAN, a base transceiver station (BTS) in GSM or CDMA, or may be a NodeB (NB) in WCDMA, or a gNB in an NR system, or may further be an evolved NodeB (eNB or eNodeB) in LTE, or a regeneration station or an access point, or an in-vehicle device, a wearable device, a network device in a future 5G network, a network device in a future evolved PLMN network, or the like. For ease of description, in the embodiments of the present disclosure, all the foregoing apparatuses that provide a wireless communication function for the terminal device are generally referred to as an access network device. In the present disclosure, if there is no special description, the network device and the access network device are equivalent terms.

Moreover, in the embodiments of the present disclosure, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have features of small coverage and low transmit power, and are suitable for providing high-speed data transmission services.

In addition, in an LTE system or a 5G system, a plurality of cells may simultaneously work on a carrier at a same frequency. In some special scenarios, it may also be considered that the concept of carrier is equivalent to the concept of cell. For example, in a carrier aggregation (CA) scenario, when a secondary component carrier is configured for UE, a carrier index of the secondary component carrier and a cell identity (Cell ID) of a secondary serving cell operating on the secondary component carrier are both carried. In this case, it may be considered that a concept of a carrier is equivalent to that of a cell, for example, access by UE to a carrier is equivalent to access to a cell.

The method and apparatus provided in the embodiments of the present disclosure may be applied to the terminal device or the network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, a contact list, word processing software, and instant messaging software. In addition, in the embodiments of the present disclosure, a specific structure of an execution body of the method provided in the embodiments of the present disclosure is not particularly limited, provided that a program recording code of the method provided in the embodiments of the present disclosure is run, so that communication can be performed according to the method provided in the embodiments of the present disclosure. For example, the execution body of the method provided in the embodiments of the present disclosure may be a terminal device or a network device, or a function module that is in the terminal device or the network device and that can invoke the program and execute the program.

In addition, aspects or features in the embodiments of the present disclosure may be implemented as a method, an apparatus or a product that uses standard programming and/or engineering technologies. The term "product" used in the present disclosure covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a wireless communications system according to an embodiment of the present disclosure. As shown in FIG. 1, the communications system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, an antenna group may be designed to communicate with a terminal device in the sector within coverage of the network device 102. The network device may send, by using a single antenna or a plurality of antenna transmit diversities, a signal to all terminal devices in a sector corresponding to the network device. In a process in which the network device 102 communicates with the terminal devices 116 and 122 separately by using the forward links 118 and 124, a transmit antenna of the network device 102 may improve signal-to-noise ratios of the forward links 118 and 124 through beamforming. In addition, compared with a manner in which the network device sends, by using a single antenna or a plurality of antenna transmit diversities, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain (for example, generate, receive from another communications apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

In addition, the communications system 100 may be a PLMN network, or a D2D network, or an M2M network, or another network. FIG. 1 is merely a simplified schematic diagram as an example. The network may further include another network device, and the another network device is not drawn in FIG. 1.

A frequency domain resource for wireless communication in this embodiment of the present disclosure is described in detail below.

In this embodiment of the present disclosure, the frequency domain resource used by the network device and the terminal device for wireless communication (for example, uplink transmission or downlink transmission) is a frequency domain resource used based on a contention mechanism.

For example, the network device and/or the terminal device may detect whether a frequency domain resource having a bandwidth (for example, 20 MHz) is in an idle status currently, or in other words, whether the frequency domain resource is used by another device.

If the frequency domain resource is in the idle status, or in other words, the frequency domain resource is not used by another device, the network device and/or the terminal device may perform communication, for example, uplink transmission or downlink transmission by using the frequency domain resource.

If the frequency domain resource is not in the idle status, or in other words, the frequency domain resource is already used by another device, the network device and/or the terminal device cannot use the frequency domain resource.

It should be noted that, in this embodiment of the present disclosure, a specific method and process of the foregoing contention mechanism may be similar to the prior art. To avoid repetition, detailed descriptions of the method and process are omitted herein.

By way of example and not limitation, in this embodiment of the present disclosure, the frequency domain resource (or in other words, a frequency domain resource used by the network device and the terminal device based on a contention mechanism) used by the communications system 100 may also be a licensed spectrum resource. To be specific, the communications system 100 of this embodiment of the present disclosure is a communications system that can use a licensed band, and communications devices (the network device and/or the terminal device) in the system 100 may use a frequency domain resource of the licensed band in a contention manner.

A "licensed frequency domain resource" may also be referred to as a "licensed spectrum resource" or a "licensed carrier", and is a frequency domain resource that can be used only after being approved by the state or local wireless committee. Different systems, for example, an LTE system and a Wi-Fi system, or systems included in different operators cannot share a licensed frequency domain resource.

The licensed spectrum resource is a spectrum resource that is designated by a radio regulation committee of a government for a special purpose, for example, a spectrum resource that is used by a mobile operator, or a spectrum resource that is exclusively used in civil aviation, railway, and police. Due to policy exclusiveness, service quality of the licensed spectrum resource can be generally ensured, and scheduling control can be relatively easily performed.

Alternatively, in this embodiment of the present disclosure, the frequency domain resource used by the communications system 100 (or in other words, the frequency domain resource used by the network device and the terminal device based on the contention mechanism) may be a grant-free frequency domain resource.

The "grant-free frequency domain resource" may also be referred to as a "grant-free spectrum resource" or a "grant-free carrier", and is a resource that is in a grant-free band and that can be shared by the communications devices. "Sharing a resource in a grant-free band" may mean that only indexes such as transmit power and out-of-band leakage are specified for use of a particular spectrum, to ensure that a plurality of devices sharing the frequency band meet a basic coexistence requirement. An operator can implement network traffic offloading by using a grant-free band resource. However, regulatory requirements on a grant-free band resource in different regions and different spectrums need to be complied with. These requirements are generally formulated to protect a radar or another common system, and ensure that a plurality of systems do not impose harmful impact to each other as far as possible and fairly coexist, and include a transmit power limitation, an out-of-band leakage index, and indoor and outdoor use limitations, and there are some additional coexistence policies and the like in some regions. For example, the communications devices can use a frequency domain resource in a contention manner or a monitoring manner, for example, a listen before talk (LBT) specified manner.

By way of example and not limitation, in this embodiment of the present disclosure, the grant-free spectrum resource may include frequency bands near 5 Giga Hertz (GHz), frequency bands near 2.4 GHz, frequency bands near 3.5 GHz, frequency bands near 37 GHz, or frequency bands near 60 GHz.

By way of example and not limitation, in this embodiment of the present disclosure, the communications system 100 may use technologies such as licensed-assisted access (LAA), dual connectivity (DC), and grant-free independent deployment (Standalone). The foregoing technology may be based on an LTE system, or an NR system, or another communications system. This is not limited in the present disclosure.

In addition, by way of example and not limitation, there may be no fixed frame structure for information transmission in a grant-free band. Generally, the access network device, for example, a base station or a cell, may determine, after successfully preempting a grant-free spectrum resource, downlink information transmission duration and/or uplink information transmission duration based on downlink service load and/or uplink service load or another considered factor. Further, after successfully preempting the grant-free spectrum resource, the access network device may flexibly adjust a quantity of time units including downlink information (that is, downlink time units, where the downlink time unit may be a downlink transmission time interval TTI, a downlink subframe, a downlink slot, a downlink mini-slot, or the like), a quantity of time units including uplink information (that is, uplink time units, where the uplink time unit may be an uplink transmission time interval TTI, an uplink subframe, an uplink slot, an uplink mini-slot, or the like), downlink information transmission duration included in each downlink time unit, and uplink information transmission duration included in each uplink time unit.

In the embodiments of the present disclosure, a physical channel is specifically used for transmitting data information and/or control information. For example, the physical channel includes one of the following or a combination thereof: a PUSCH (physical uplink shared channel), a PUCCH (physical uplink control channel), a PDCCH (Physical Downlink Control Channel), an EPDCCH (Enhanced-Physical Downlink Control Channel), a PCFICH (Physical Control Format Indicator Channel), a PHICH (Physical hybrid ARQ indicator channel), a PDSCH (Physical Downlink Shared Channel), and the like, or a channel that has a same function but a different name and that is newly introduced into a standard, such as a control channel or a data channel introduced into short TTI transmission.

It should be understood that, in the embodiments of the present disclosure, "when" and "if" both refer to that the terminal device or the access network device performs corresponding processing in an objective case, and do not limit time, and do not require the terminal device or the access network device to perform a determining action during implementation, and do not mean there is another limitation.

In downlink data transmission in the prior art, a data packet is encoded and modulated, and then mapped to a physical resource in a first-frequency-then-time sequence. In uplink data transmission in the prior art, a data packet is encoded and modulated, and then arranged on a virtual resource in a first-time-then-frequency sequence, then DFT modulation is performed on a symbol corresponding to each virtual resource, and then the symbol on which the DFT modulation is performed is mapped to a physical resource corresponding to the symbol.

In a specific scheduling process in the wireless communications system, UE receives a control channel (for example, a PDCCH or another control channel) sent by a base station. The control channel may carry scheduling information in a transport block on a data channel (for example, a PDSCH, a PUSCH, or another data channel). The scheduling information includes control information such as resource allocation information of the data channel that carries the transport block, or a modulation and coding scheme. The UE receives or sends the data channel based on the control information carried on the detected control channel.

The following briefly describes a general baseband process of sending a downlink transport block.

1) Segmentation is performed on original payload information of a TB. To be specific, the original payload information is divided into a plurality of code blocks based on a predefined rule (for example, if a quantity of bits of the original payload information exceeds a value, the original payload information is divided into a plurality of code blocks, and if the quantity of bits of the original payload information does not exceed the value, certainly, the original payload information does not need to be divided).

2) A CRC bit corresponding to each code block, that is, code block CRC, is added to payload of the code block; and CRC, that is, TB CRC, is added to payload formed by all code blocks.

3) Channel coding, for example, Turbo code or LDPC, is separately performed on each code block to which CRC is added, to form a code word.

For a non-MIMO mode, the UE usually generates one code word (or one TB). For a MIMO mode, the UE may generate two code words (or two TBs). In other words, original payload information in the two code words is mutually independent. If there is no special description in the present disclosure, it is assumed that there is one code word, and the solution may be directly independently expanded to a case in which there are two code words.

4) Scrambling and constellation modulation are performed on the code word to form a modulation symbol. The scrambling may be based on an initiating state and a random or a pseudo random function of a cell identity and/or a UE identity. The constellation modulation usually includes QPSK, 16QAM, 64QAM, 256QAM, or the like.

5) The modulation symbol is mapped to a physical resource of time, frequency, and space.

6) Finally, IDFT or IFFT conversion is performed on the modulation symbol, so that the modulation symbol is converted to time domain, and the modulation symbol converted to time domain is sent.

For a baseband process of sending an uplink transport block based on a single-carrier transmission mode, operation 5) is different from that of the process of sending a baseband of a downlink transport block, and is specifically:

5) the modulation symbol is mapped to a virtual resource of time, frequency, and space, and DFT modulation is performed on a modulation symbol included in each symbol in the virtual resource, and then information obtained after the DFT modulation is mapped to a physical resource corresponding to the symbol.

Embodiment 1

With evolution of communications technologies, a spectrum resource used to perform wireless communication in a communications system may be used in a manner of a large bandwidth. For example, a bandwidth of a carrier is 80 M. A large subcarrier spacing may be set on a carrier with a large system bandwidth. Correspondingly, a symbol length is shortened, so that a system transmission latency is shortened. Because a system bandwidth on the carrier is large, a frequency resource of the carrier may be divided into a plurality of subbands. One physical channel may be transmitted on the plurality of subbands. When the physical channel is transmitted on the plurality of subbands, if an existing first-frequency-domain-then-time-domain mapping method is still used, the communications device needs to have a large-bandwidth processing capability, and therefore implementation complexity is increased. If an existing first time-domain-then-frequency-domain mapping method is still used, the communications device needs to wait until an entire transmission period ends, and then starts to perform physical channel demodulation, and a processing latency is increased. Therefore, when a system bandwidth of one carrier is divided into a plurality of subbands, a new resource mapping method needs to be considered to send and receive a physical channel.

Figure 2:
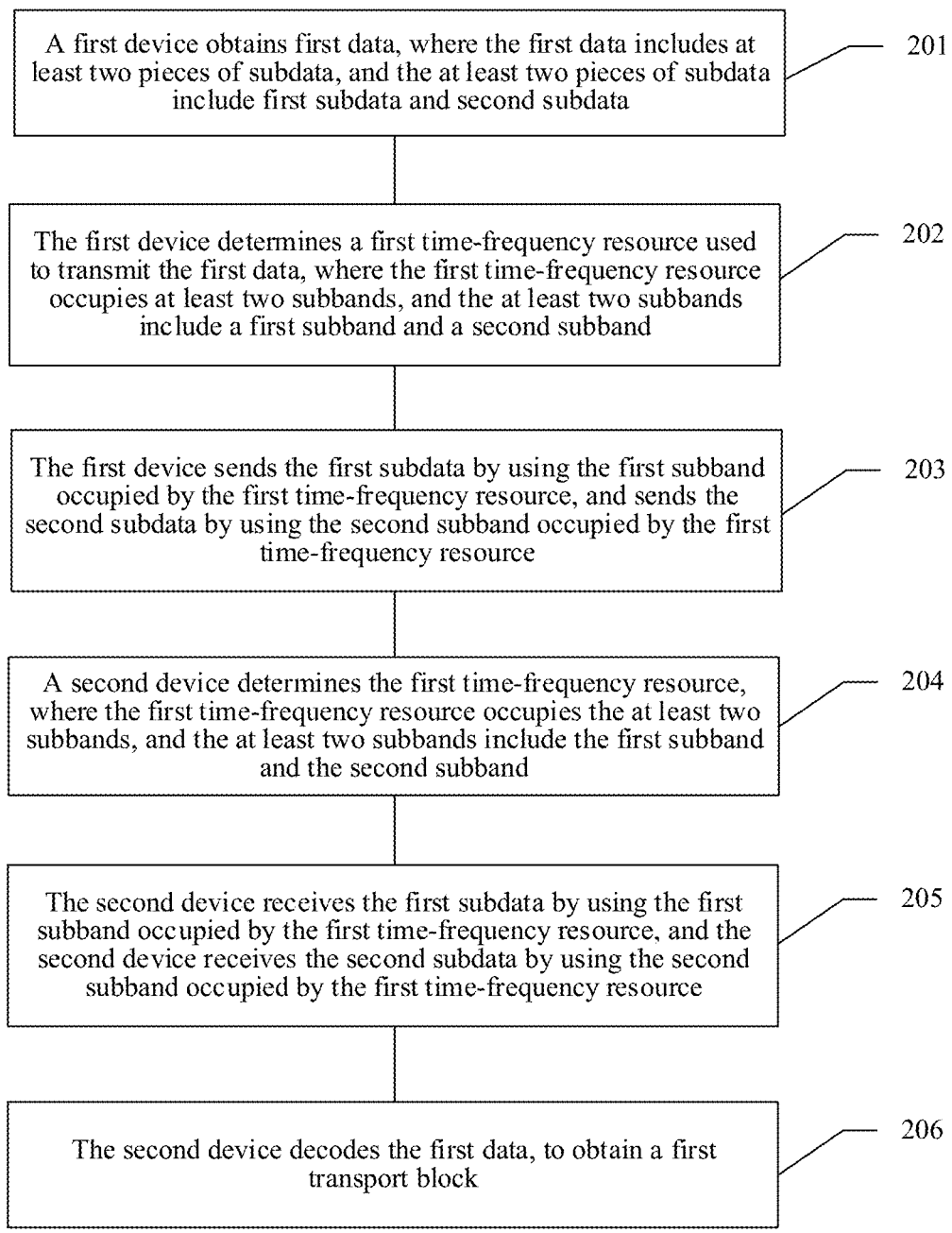
FIG. 2 is a schematic flowchart of an embodiment of a data sending method according to the present disclosure.

FIG. 2 shows an embodiment of a data sending method provided in the present disclosure, and the data sending method includes the following operations.

Operation S201: A first device obtains first data, where the first data includes data obtained by encoding a first transport block (TB), the first data includes at least two pieces of subdata, and the at least two pieces of subdata include first subdata and second subdata.

In one embodiment, the first device is an access network device. The first data includes at least one of downlink data information, downlink control information, and downlink ultra reliable low latency communication (URLLC) data information, and the like. In one embodiment, the first data is sent by using a downlink physical channel, for example, a physical downlink shared channel (PDSCH) or a physical downlink control channel (PDCCH).

In one embodiment, the first device is a terminal device. The first data includes at least one of uplink data information, uplink control information, and uplink ultra reliable low latency communication (URLLC) data information, and the like. In one embodiment, the first data is sent by using an uplink physical channel, for example, a physical uplink shared channel (PUSCH) or a physical uplink control channel (PUCCH).

In one embodiment, the first TB includes one TB. In one embodiment, the first TB includes at least two TBs. The at least two TBs may be TBs of a same type of information, or TBs of different types of information. For example, the at least two TBs are TBs corresponding to downlink data information of a same service. For another example, the at least two TBs are TBs corresponding to downlink data information of different services (for example, one service is a normal service, and another service is a URLLC service). For another example, the at least two TBs are TBs corresponding to different information (for example, one type of information is data information, and another type of information is control information).

Operation S202: The first device determines a first time-frequency resource used to transmit the first data, where the first time-frequency resource occupies at least two subbands, and the at least two subbands include a first subband and a second subband.

In one embodiment, the first time-frequency resource is a time-frequency resource that is allocated by the access network device by using scheduling information and that is used to carry the first data. The first time-frequency resource may be a resource on a licensed spectrum, or a resource on a grant-free spectrum.

In this embodiment of the present disclosure, the access network device allocates the first time-frequency resource by using the scheduling information. Scheduling may be dynamic scheduling or half-static scheduling, and this is not particularly limited in the present disclosure.

For example, when the scheduling information is dynamic scheduling information, the scheduling information may be allocated by the access network device to the terminal device after the access network device determines that the terminal device needs to perform downlink receiving or uplink sending. In addition, when the scheduling information schedules the terminal device to perform uplink sending, the scheduling information may be sent by the access network device to the terminal device after the access network device determines that the terminal device needs to perform uplink sending (for example, after the terminal device sends data request information).

For another example, when the scheduling information is half-static scheduling information, the scheduling information may be allocated by the access network device to the terminal device before the access network device determines that the terminal device needs to perform downlink receiving or uplink sending. In addition, when the scheduling information schedules the terminal device to perform uplink sending, the scheduling information may be sent by the access network device to the terminal device before the access network device determines that the terminal device needs to perform uplink sending (for example, before the terminal device sends the data request information).

In one embodiment, the access network device may send the scheduling information to the terminal device by using a carrier on a licensed spectrum, or send the scheduling information to the terminal device by using a carrier on a grant-free spectrum. This is not particularly limited in the present disclosure.

In one embodiment, the scheduling information includes a transmission parameter that indicates to transmit the first TB. The transmission parameter may include at least one of the following:

a quantity or indexes of subbands used to transmit the first data (that is, data obtained after the first TB is encoded), a size of a frequency domain resource (for example, a quantity of resource blocks (RB)) corresponding to the first TB, a modulation and coding scheme (MCS) index used to determine a size of the first TB, a modulation order corresponding to the first TB, a bit rate corresponding to the first TB, a time domain start location when the terminal device transmits the first TB, a redundancy version used when the terminal device transmits the first TB, an antenna port used when the terminal device transmits the first TB, and a precoding matrix index used when the terminal device transmits the first TB.

In one embodiment, that the first time-frequency resource occupies at least two subbands may be that the first time-frequency resource occupies all of resources in the at least two subbands, or occupy some of the resources in the at least two subbands. Without loss of generality, description is provided by using an example in which the first time-frequency resource occupies two subbands, and the two subbands are the first subband and the second subband, and one of the following cases may be included:

the first time-frequency resource occupies all of resources in the first subband and the second subband;

the first time-frequency resource occupies all of resources in the first subband, and the first time-frequency resource occupies some of resources in the second subband;

the first time-frequency resource occupies some of the resources in the first subband, and the first time-frequency resource occupies all of the resources in the second subband; and the first time-frequency resource occupies some of the resources in the first subband, and the first time-frequency resource occupies some of the resources in the second subband.

It should be noted that, system parameters (for example, subcarrier spacings or lengths of cyclic prefixes of symbols) corresponding to resources occupied by the first time-frequency resource in both of the at least two subbands occupied by the first time-frequency resource may be the same or may be different. This is not limited in the present disclosure. For example, subcarrier spacings of resources occupied by the first time-frequency resource in the first subband and the second subband are both 60 kHz. For another example, a subcarrier spacing of resources occupied by the first time-frequency resource in the first subband is 60 kHz, and a subcarrier spacing of resources occupied by the first time-frequency resource in the second subband is 30 kHz.

In one embodiment, quantities of the resources occupied by the first time-frequency resource in both of the at least two subbands occupied by the first time-frequency resource are the same. Further in one embodiment, relative locations of the resources occupied by the first time-frequency resource in both of the at least two subbands occupied by the first time-frequency resource are the same.

Operation S203: The first device sends the first subdata by using the first subband occupied by the first time-frequency resource, and sends the second subdata by using the second subband occupied by the first time-frequency resource.

In one embodiment, the first device maps the first subdata to the first subband, maps the second subdata to the second subband, sends the first subdata by using the first subband, and sends the second subdata by using the second subband.

The first device sends the first data to a second device. In one embodiment, the first device is the access network device, and the second device is the terminal device. In one embodiment, the first device is the terminal device, and the second device is the access network device.

Operation S204: The second device determines the first time-frequency resource, where the first time-frequency resource occupies the at least two subbands, and the at least two subbands include the first subband and the second subband.

The second device determines the first time-frequency resource used to receive the first data.

Operation S205: The second device receives the first data on the first time-frequency resource, where the second device receives the first subdata by using the first subband occupied by the first time-frequency resource, and the second device receives the second subdata by using the second subband occupied by the first time-frequency resource.

The second device receives the first data sent by the first device.

Operation S206: The second device decodes the first data, to obtain the first transport block (TB).

It should be understood that no strict timing requirement is posed on implementation of the foregoing operations. Particularly, sequence numbers of operations do not necessarily represent an order of execution, and some operations may be simultaneously executed.

In the foregoing embodiment, when the first time-frequency resource occupies a plurality of subbands, the first data is divided into a plurality of pieces of subdata. Each piece of subdata is mapped to a subband for transmission. Because a sending end performs resource mapping and transmission by using a subband as a unit, a receiving end may also perform reception by using a subband as a unit. In this way, a requirement posed on a sending device and/or a receiving device to have a high-bandwidth processing capability may be reduced without increasing complexity of the receiving end, a processing latency during channel demodulation may be reduced, and processing efficiency of the system may be improved.

In S201, the first device obtains the first data, and the first data is data obtained after the first transport block (TB) is encoded. In one embodiment, the first device encodes the first transport block (TB) to obtain the first data. The encoding process may include operations such as adding cyclic redundancy check (CRC), coding, and interleaving. The process may be similar to a method and process of encoding by a communications device (the network device or the terminal device) in the prior art. To avoid repetition, detailed descriptions of the process are omitted herein. It should be noted that, the encoding manner may be Turbo encoding, convolutional code encoding, LDPC encoding, RM encoding, or another encoding manner. This is not limited in the present disclosure.

In one embodiment, the encoding process may further include modulating, in a modulation manner, bits obtained after the foregoing operations such as adding CRC, coding, and interleaving are performed, to obtain modulated symbols. The modulation manner may be BPSK, QPSK, 16QAM, 64QAM, 256QAM, 1024QAM, or the like. The process may be similar to a method and process of modulating by a communications device (the network device or the terminal device) in the prior art. To avoid repetition, detailed descriptions of the process are omitted herein.

It should be noted that, the first TB may include one or more TBs. The first TB may be a TB corresponding to data information, or a TB corresponding to control information, or a TB corresponding to URLLC data information. The first TB may alternatively be a plurality of TBs corresponding to a plurality types of the foregoing information. This is not limited in the present disclosure. When the first TB is the plurality of TBs corresponding to a plurality of types of information, TBs corresponding to different information may be encoded in a same encoding manner, or may be encoded in different encoding manners. This is not limited in the present disclosure.

The first data is described below by using an example in which the first TB includes one TB. It is assumed that the first TB includes A bits denoted as $a_0, a_1, a_2, a_3, \ldots, a_{A-1}$, and the first data obtained after the first TB is encoded includes B bits, denoted as $b_0, b_1, b_2, b_3, \ldots, b_{B-1}$.

Figure 3:
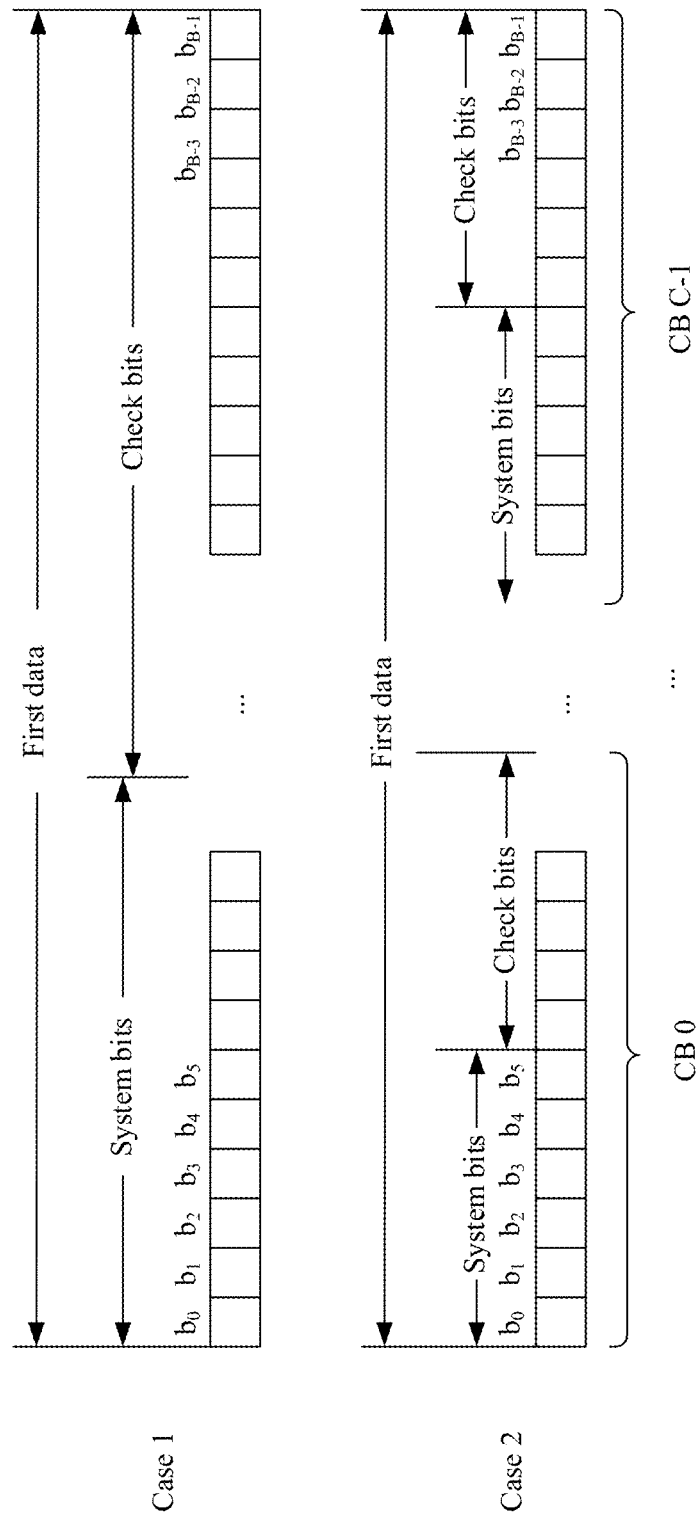
FIG. 3 is a schematic diagram of a relationship between first subdata and second subdata in first data.

In an implementation, front bits in the first data are system bits obtained after the first TB is encoded, and rear bits in the first data are check bits obtained after the first TB is encoded, as shown in case 1 of FIG. 3.

In another implementation, the first TB includes C code blocks (CB), where C is a positive integer greater than 1. The first data obtained after the first TB is encoded includes C parts, where each part corresponds to data obtained after one code block is encoded. Further in one embodiment, in corresponding data obtained after each code block is encoded, front bits are system bits obtained after the code block is encoded, and rear bits are check bits obtained after the code block is encoded, as shown in case 2 of FIG. 3.

In another implementation, when the first TB includes C code blocks, the C code blocks may be grouped into S code block groups (CBG), where S is a positive integer greater than or equal to 2, and each code block group includes at least one code block. In one embodiment, quantities of code blocks included in the code block groups are the same. In one embodiment, quantities of code blocks included in at least two of the S code block groups are different.

It should be understood that, in this embodiment of the present disclosure, FIG. 3 is a schematic diagram of the first data obtained after the first TB is encoded. FIG. 3 is used to better describe the first data, and does not mean that storage and the like of the first data are limited.

In one embodiment, a length of the first data is a length of a cyclic soft reference corresponding to the first TB. In one embodiment, the length of the first data is determined based on a size of the first TB. In an implementation, the length of the first data is determined based on a maximum bit rate at which the first TB is transmitted. In another implementation, the length of the first data is determined based on a minimum bit rate at which the first TB is transmitted. In another implementation, the length of the first data is determined based on a preset bit rate at which the first TB is transmitted.

In an implementation, the length of the first data is determined based on a size of the first time-frequency resource that is allocated by the network device and that is used to transmit the first data. In another implementation, the length of the first data is determined based on a size of a time-frequency resource actually used to transmit the first data. The length of the first data may alternatively be determined in another manner. This is not limited in the present disclosure.

In one embodiment, when the first TB includes a plurality of TBs (for example, at least two TBs), the first data includes a plurality of parts, and each part corresponds to data obtained after one TB is encoded. Without loss of generality, description is provided by using an example in which the first TB includes two TBs. In an implementation, in the two TBs included in the first TB, each TB includes only one code block CB, and in corresponding data obtained after each TB is encoded, locations of system bits and check bits are the same as those of data obtained after a single CB is encoded, as shown in the case 1 of FIG. 3, and details are not described herein again. In another implementation, each of the two TBs included in the first TB includes at least two code blocks CB, and in corresponding data obtained after each TB is encoded, locations of system bits and check bits are the same as those of data obtained after a plurality of CBs in a single TB are encoded, as shown in the case 2 of FIG. 3, and details are not described herein again. In another implementation, one of the two TBs included in the first TB includes at least two code blocks CB (for example, the TB is data information), and the other TB includes one code block CB (for example, the TB is control information), and in corresponding data obtained after different TBs are encoded, locations of system bits and check bits may be different. For example, the first TB includes two TBs, and the two TBs respectively correspond to control information and data information. Locations of system bits and check bits obtained after the TB including one code block CB (control information) is encoded are shown in the case 1 of FIG. 3, and locations of system bits and check bits obtained after the TB including a plurality of code blocks CB (data information) is encoded are shown in the case 2 of FIG. 3.

In this embodiment of the present disclosure, the first data includes at least two pieces of subdata, and the at least two pieces of subdata include first subdata and second subdata. The first subdata and the second subdata are described below by using an example in which the first TB includes one TB.

Figure 4:
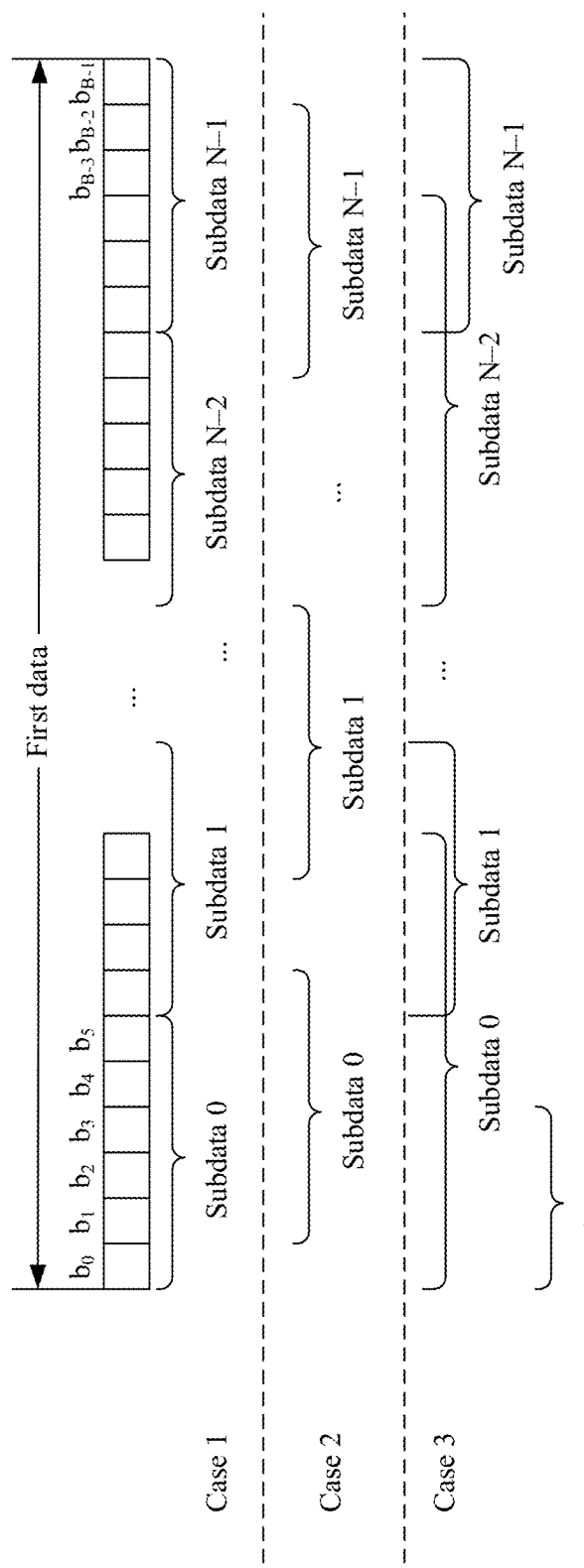
FIG. 4 is a schematic diagram of another relationship between first subdata and second subdata in first data.

Case 1: The first TB includes one code block. By way of example and not limitation, FIG. 4 is a schematic diagram for describing the first subdata and the second subdata according to the present disclosure. The first data includes N pieces of subdata, where N is a positive integer greater than or equal to 2.

In one embodiment, the first subdata and/or the second subdata are/is a continuous part in the first data. For example, one piece of subdata corresponds to a start location and a length in the first data.

In one embodiment, if a start location of one piece of subdata corresponding to the first data is a start point P in the first data, assuming that a length starting from the start point P to an end location of the first data is less than a length of the subdata, values are assigned to the subdata in a cyclic manner starting from a start location of the first data. It should be understood that, when the subdata is a continuous part in data formed by continuous bit streams output after a code block or a code block group is encoded, a manner of determining the subdata (that is, values are assigned in a cyclic manner from data formed by the continuous bit streams output after encoding) is still applicable. Descriptions of similar cases are omitted below.

In one embodiment, a priority of the first subdata is higher than that of the second subdata.

In one embodiment, the first subdata includes high-priority data obtained after the code block is encoded, and the second subdata includes low-priority data obtained after the code block is encoded.

In one embodiment, a start location of the first subdata is a preset location in the continuous bit streams after the code block is encoded. For example, the start location of the first subdata is a start bit (that is, a first bit b0) in the continuous bit streams after the code block is encoded. For another example, the start location of the first subdata is a location corresponding to a redundancy version RV0 in the continuous bit streams after the code block is encoded. The start location of the first subdata may alternatively be another preset location, and is not limited in the present disclosure.

In one embodiment, system bits included in the first subdata are no fewer than system bits included in the second subdata. For example, as shown in FIG. 4, the first subdata includes subdata 0, the second subdata includes subdata N−1, bits included in the subdata 0 are system bits, bits included in the subdata N−1 are check bits, and the system bits included in the subdata 0 are no fewer than the system bits included in the subdata N−1, that is, the system bits included in the first subdata are no fewer than the system bits included in the second subdata.

In one embodiment, start locations of the first subdata and the second subdata in the first data are the same.

In one embodiment, the start locations of the first subdata and the second subdata in the first data are different.

In one embodiment, the start location of the first subdata and the start location of the second subdata respectively correspond to start locations of different redundancy versions (RV) of the first data. For example, the start location of the first subdata is a location corresponding to the redundancy version RV0 in the continuous bit streams after the code block is encoded, and the start location of the second subdata is a start location of a redundancy version RV2 in the continuous bit streams after the code block is encoded.

In one embodiment, a bit corresponding to the start location of the second subdata and a bit corresponding to an end location of the first subdata are continuous in the first data, for example, as shown in the case 1 of FIG. 4.

In one embodiment, bits included in the first subdata do not overlap bits included in the second subdata, and the bit corresponding to the start location of the second subdata and the bit corresponding to the end location of the first subdata are discontinuous in the first data, for example, as shown in the case 2 of FIG. 4.

In one embodiment, the bits included in the first subdata partially overlap the bits included in the second subdata, that is, the start location of the second subdata is located in the first subdata, for example, as shown in the case 3 of FIG. 4.

In one embodiment, the start location of the first subdata and/or the start location of the second subdata in the first data are/is specified by a communications system. In one embodiment, the start location of the first subdata and/or the start location of the second subdata in the first data are/is pre-indicated by a network device.

In one embodiment, the high-priority data includes data formed by continuous bit streams output first after the code block is encoded, and the low-priority data includes data formed by continuous bit streams output subsequently after the code block is encoded. For example, as shown in FIG. 4, the high-priority data includes the subdata 0, and the low-priority data includes subdata 1. Continuous bit streams that are output after the code block is encoded and that are included in the subdata 0 are located in front of continuous bit streams that are output after the code block is encoded and that are included in the subdata 1. Therefore, the first subdata includes the subdata 0, and the second subdata includes the subdata 1.

In one embodiment, a start location of the high-priority data is a preset location in the continuous bit streams after the code block is encoded. For example, the start location of the high-priority data is a start bit (that is, the first bit b0) in the continuous bit streams after the code block is encoded. For another example, the start location of the high-priority data is a location corresponding to the redundancy version RV0 in the continuous bit streams after the code block is encoded.

In one embodiment, system bits included in the high-priority data are no fewer than system bits included in the low-priority data. For example, as shown in FIG. 4, the high-priority data includes the subdata 0, the low-priority data includes the subdata N−1, the bits included in the subdata 0 are the system bits, the bits included in the subdata N−1 are the check bits, and the system bits included in the subdata 0 are no fewer than the system bits included in the subdata N−1, that is, the system bits included in the high-priority data are no fewer than the system bits included in the low-priority data.

In one embodiment, start locations of the high-priority data and the low-priority data in the first data are the same.

In one embodiment, the start locations of the high-priority data and the low-priority data in the first data are different.

In one embodiment, the start location of the high-priority data and the start location of the low-priority data respectively correspond to the start locations of the different redundancy versions RV of the first data. For example, the start location of the high-priority data is the location corresponding to the redundancy version RV0 in the continuous bit streams after the code block is encoded, and the start location of the low-priority data is the start location of the redundancy version RV2 in the continuous bit streams after the code block is encoded.

In one embodiment, a bit corresponding to the start location of the low-priority data and a bit corresponding to an end location of the high-priority data are continuous in the first data, for example, as shown in the case 1 of FIG. 4.

In one embodiment, bits included in the high-priority data do not overlap bits included in the low-priority data, and the bit corresponding to the start location of the low-priority data and the bit corresponding to the end location of the high-priority data are discontinuous in the first data, for example, as shown in the case 2 of FIG. 4.

In one embodiment, the bits included in the high-priority data partially overlap the bits included in the low-priority data, that is, the start location of the low-priority data is located in the high-priority data, for example, as shown in the case 3 of FIG. 4.

In one embodiment, the start location of the high-priority data and/or the start location of the low-priority data in the first data are/is specified by the communications system. In one embodiment, the start location of the high-priority data and/or the start location of the low-priority data in the first data are/is pre-indicated by the network device.

Case 2: The first TB includes at least two (for example, S, where S is a positive integer greater than or equal to 2) code block groups CBG, where each of the at least two CBGs includes at least one code block, and the at least two CBGs include a first CBG and a second CBG. In one embodiment, the S code block groups include a total of C code blocks, where C is a positive integer greater than or equal to 2.

It should be noted that, the at least two CBGs may both correspond to original information of a same type or a same service, or, the at least two CBGs may alternatively respectively correspond to original information of different types or different services, or one of the at least two CBGs may also include original information of different types or different services. This is not limited in the present disclosure. By way of example and not limitation, the first CBG and the second CBG respectively correspond to original information of different priorities, or, the first CBG and the second CBG respectively correspond to original information of different types. For example, a priority of the first CBG is higher than that of the second CBG, that is, importance of the first CBG is higher than that of the second CBG. Specifically, the first CBG includes control information, and the second CBG includes normal service data and does not include control information. For another example, the first CBG is service data of URLLC, and the second CBG is normal service data. For another example, the first CBG is the service data of URLLC, and the second CBG is control information. For another example, in some scenarios, the first CBG is control information (for example, HARQ feedback information), and the second CBG is the service data of URLLC. It should be understood that, the foregoing example of priority is merely an example for description, and priorities of original information of different types may alternatively be distinguished from another dimension, and this is not limited in the present disclosure.

By way of example and not limitation, FIG. 4 shows an example of the schematic diagram for describing the first subdata and the second subdata according to the present disclosure. The first data obtained after the first TB is encoded includes C parts, where each part corresponds to data obtained after one code block is encoded. In one embodiment, in corresponding data obtained after each code block is encoded, front bits are system bits obtained after the code block is encoded, and rear bits are check bits obtained after the code block is encoded. To be specific, the first data in FIG. 4 is similar to the first data in the case 2 of FIG. 3.

In one embodiment, the first subdata and/or the second subdata are/is a continuous part in the first data. For example, one piece of subdata corresponds to a start location and a length in the first data.

In one embodiment, the first subdata includes high-priority data obtained after the C code blocks are encoded, and the second subdata includes low-priority data obtained after the C code blocks are encoded.

In one embodiment, a start location of the first subdata is a preset location in the continuous bit streams after the C code blocks are encoded. For example, the start location of the first subdata is a start bit (that is, the first bit b0) in the continuous bit streams after the C code blocks are encoded. For another example, the start location of the first subdata is a location corresponding to the redundancy version RV0 in the continuous bit streams after the C code blocks are encoded.

In one embodiment, system bits included in the first subdata are no fewer than system bits included in the second subdata.

In one embodiment, the start locations of the first subdata and the second subdata in the first data are different.

In one embodiment, the start location of the first subdata and the start location of the second subdata respectively correspond to the start locations of different redundancy versions RV of the first data. For example, the start location of the first subdata is a location corresponding to the redundancy version RV0 in the continuous bit streams after the C code blocks are encoded, and the start location of the second subdata is a start location of the redundancy version RV2 in the continuous bit streams after the C code blocks are encoded.

In one embodiment, a bit corresponding to the start location of the second subdata and a bit corresponding to an end location of the first subdata are continuous in the first data, for example, as shown in the case 1 of FIG. 4.

In one embodiment, bits included in the first subdata do not overlap bits included in the second subdata, and the bit corresponding to the start location of the second subdata and the bit corresponding to the end location of the first subdata are discontinuous in the first data, for example, as shown in the case 2 of FIG. 4.

In one embodiment, the bits included in the first subdata partially overlap the bits included in the second subdata, that is, the start location of the second subdata is located in the first subdata, for example, as shown in the case 3 of FIG. 4.

In one embodiment, the start location of the first subdata and/or the start location of the second subdata in the first data are/is specified by the communications system. In one embodiment, the start location of the first subdata and/or the start location of the second subdata in the first data are/is pre-indicated by the network device.

In one embodiment, the high-priority data includes data formed by continuous bit streams output first after the C code blocks are encoded, and the low-priority data includes data formed by continuous bit streams output subsequently after the C code blocks are encoded. For example, as shown in FIG. 4, the high-priority data includes the subdata 0, and the low-priority data includes subdata 1. Continuous bit streams that are output after the code blocks are encoded and that are included in the subdata 0 are located in front of continuous bit streams that are output after the code blocks are encoded and that are included in the subdata 1. Therefore, the first subdata includes the subdata 0, and the second subdata includes the subdata 1.

Figure 5:
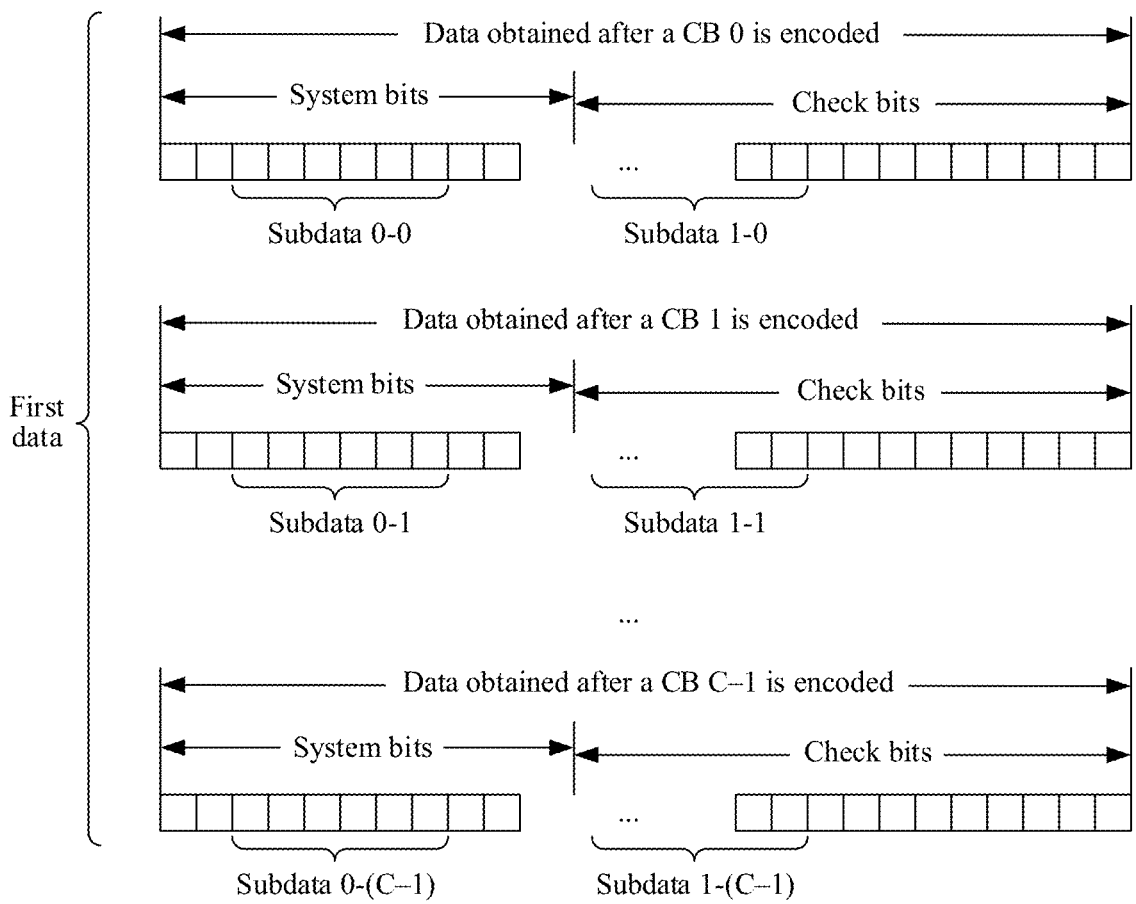
FIG. 5 is a schematic diagram of another relationship between first subdata and second subdata in first data.

By way of example and not limitation, FIG. 5 shows another example of the schematic diagram for describing the first subdata and the second subdata according to the present disclosure. The first data obtained after the first TB is encoded includes C parts, where each of the C parts corresponds to data obtained after one code block is encoded. In one embodiment, in corresponding data obtained after each code block is encoded, front bits are system bits obtained after the code block is encoded, and rear bits are check bits obtained after the code block is encoded.

In the case 2, the first subdata and the second subdata may be divided in the following two manners:

In a first manner, the first subdata includes data obtained after a first code block group is encoded and does not include data obtained after a second code block group is encoded, and the second subdata includes the data obtained after the second code block group is encoded and does not include the data obtained after the first code block group is encoded.

For example, the first code block group includes a CB 0 and a CB 1, and the second code block group includes a CB C-2 and a CB C-1. As shown in FIG. 5, the first subdata includes data obtained after the CB 0 and the CB 1 are encoded, that is, includes system bits and check bits obtained after the CB 0 is encoded, and system bits and check bits obtained after the CB 1 is encoded. In addition, the first subdata does not include data obtained after the CB C-2 and the CB C-1 are encoded. The second subdata includes data obtained after the CB C-2 and the CB C-1 are encoded, that is, includes system bits and check bits obtained after the CB C-2 is encoded, and system bits and check bits obtained after the CB C-1 is encoded. In addition, the second subdata does not include the data obtained after the CB 0 and the CB 1 are encoded.

In one embodiment, the first subdata is a continuous part in data formed by continuous bit streams output after the first code block group is encoded. For example, the first subdata corresponds to a start location and a length in the data formed by the continuous bit streams output after the first code block group is encoded.

In one embodiment, the second subdata is a continuous part in data formed by continuous bit streams output after the second code block group is encoded. For example, the second subdata corresponds to a start location and a length in the data formed by the continuous bit streams output after the second code block group is encoded.

In one embodiment, a size of the data that is obtained after the first code block group is encoded and that is included in the first subdata is determined based on a size of a resource included in the first subband and a quantity of code block groups corresponding to the first subdata.

In one embodiment, a size of a resource that is occupied by the first code block group in the first subband and that is included in the first subdata is determined based on the size of the resource included in the first subband and the quantity of code block groups corresponding to the first subdata.

In one embodiment, the resource included in the first subband is a resource occupied by the first time-frequency resource in the first subband. In one embodiment, the resource included in the first subband is a resource occupied by the first time-frequency resource in the first subband for transmitting the first subdata. In other words, the resource included in the first subband does not include a resource occupied by the first time-frequency resource in the first subband for transmitting other information, such as a reference signal.

In one embodiment, a size of the data that is obtained after the second code block group is encoded and that is included in the second subdata is determined based on a size of a resource included in the second subband and a quantity of code block groups corresponding to the second subdata.

In one embodiment, a size of a resource that is occupied by the second code block group in the second subband and that is included in the second subdata is determined based on the size of the resource included in the second subband and the quantity of code block groups corresponding to the second subdata.

In one embodiment, the resource included in the second subband is a resource occupied by the first time-frequency resource in the second subband. In one embodiment, the resource included in the second subband is a resource occupied by the first time-frequency resource in the second subband for transmitting the second subdata. In other words, the resource included in the second subband does not include a resource occupied by the first time-frequency resource in the second subband for transmitting other information, such as a reference signal.

It may be understood that, in this implementation solution of the present disclosure, the first subdata is sent by using the resource occupied by the first time-frequency resource in the first subband, where the first subdata may correspond to a plurality of code block groups including the first code block group. To enable all of the plurality of code block groups corresponding to the first subdata to be sent by using the resource occupied by the first time-frequency resource in the first subband, a resource that can be occupied by each code block group may be determined based on the size of the resource included in the first subband and the quantity of code block groups corresponding to the first subdata. For example, in an implementation, resources included in the first subband are averagely allocated to the code block groups corresponding to the first subdata, so that the code block groups are transmitted by using an approximately same quantity of resources. In another implementation, the resources included in the first subband are allocated based on a size (for example, a size of an included original information bit) or a priority (for example, more resources are allocated to a higher-priority code block group) of each code block group. There may also be another implementation in the present disclosure, and this is not limited in the present disclosure.

In one embodiment, resources allocated to the first code block group are denoted as resources #1. When the first code block group includes one code block, all of the resources #1 are used to transmit the code block included in the first code block group. When the first code block group includes at least two code blocks, to enable all of the plurality of code blocks included in the first code block group to be sent by using the resources #1, resources that can be occupied by each code block may be determined based on the size of the resources #1 and a quantity of code blocks included in the first code block group. For example, in an implementation, the resources #1 are averagely allocated to the code blocks included in the first code block group, so that the code blocks are transmitted by using an approximately same quantity of resources. In another implementation, the resources #1 are allocated based on a size (for example, a size of an included original information bit) or a priority (for example, more resources are allocated to a higher-priority code block) of each code block. There may also be another implementation in the present disclosure, and this is not limited in the present disclosure.

It should be noted that, a manner of determining the size of the data that is obtained after the second code block group is encoded and that is included in the second subdata, or a manner of determining the size of the resource that is occupied by the second code block group in the second subband and that is included in the second subdata, or a manner of determining the size of the resource that is occupied by each code block in the second code block group and that is included in the second subdata may be similar to the foregoing manner of determining the size of the data that is obtained after the first code block group is encoded and that is included in the first subdata, or the manner of determining the size of the resource that is occupied by the first code block group in the first subband and that is included in the first subdata, or the manner of determining the size of the resource that is occupied by each code block in the first code block group and that is included in the first subdata. Details are not described herein again.

In a second manner, the first subdata includes the data obtained after the first code block group is encoded and the data obtained after the second code block group is encoded, and the second subdata also includes the data obtained after the first code block group is encoded and the data obtained after the second code block group is encoded.

In one embodiment, one piece of subdata (for example, a part of the first subdata or a part of the second subdata) is a continuous part in data formed by continuous bit streams output after the first code block group is encoded. For example, one piece of subdata corresponds to a start location and a length in the data formed by the continuous bit streams output after the first code block group is encoded.

In one embodiment, one piece of subdata (for example, a part of the first subdata or a part of the second subdata) is a continuous part in data formed by continuous bit streams output after the second code block group is encoded. For example, one piece of subdata corresponds to a start location and a length in the data formed by the continuous bit streams output after the second code block group is encoded.

In one embodiment, the first subdata includes first high-priority data obtained after the first code block group is encoded and second high-priority data obtained after the second code block group is encoded.

In one embodiment, the second subdata includes first low-priority data obtained after the first code block group is encoded and second low-priority data obtained after the second code block group is encoded.

In one embodiment, the first high-priority data includes data formed by continuous bit streams output first after the first code block group is encoded, the first low-priority data includes data formed by continuous bit streams output subsequently after the first code block group is encoded, the second high-priority data includes data formed by continuous bit streams output first after the second code block group is encoded, and the second low-priority data includes data formed by continuous bit streams output subsequently after the second code block group is encoded.

For example, as shown in FIG. 5, the first code block group includes the CB 0 and the CB 1, and the second code block group includes the CB (C-2) and the CB (C-1). Subdata 0-0 is data formed by continuous bit streams output first after the CB 0 is encoded. Subdata 1-0 is data formed by continuous bit streams output subsequently after the CB 0 is encoded. Subdata 0-1 is data formed by continuous bit streams output first after the CB 1 is encoded. Subdata 1-1 is data formed by continuous bit streams output subsequently after the CB 1 is encoded. Subdata 0-(C-2) is data formed by continuous bit streams output first after the CB (C-2) is encoded. Subdata 1-(C-2) is data formed by continuous bit streams output subsequently after the CB (C-2) is encoded. Subdata 0-(C-1) is data formed by continuous bit streams output first after the CB (C-1) is encoded. Subdata 1-(C-1) is data formed by continuous bit streams output subsequently after the CB (C-1) is encoded.

Therefore, that the first high-priority data includes data formed by continuous bit streams output first after the first code block group is encoded may be that, the first high-priority data includes data formed by continuous bit streams output first after the CB 0 and the CB 1 are encoded. In other words, the first high-priority data includes the subdata 0-0 and the subdata 0-1.

That the second high-priority data includes data formed by continuous bit streams output first after the second code block group is encoded may be that, the second high-priority data includes data formed by continuous bit streams output first after the CB (C-2) and the CB (C-1) are encoded. In other words, the second high-priority data includes the subdata 0-(C-2) and the subdata 0-(C-1).

That the first low-priority data includes data formed by continuous bit streams output subsequently after the first code block group is encoded may be that, the first low-priority data includes data formed by continuous bit streams output subsequently after the CB 0 and the CB 1 are encoded. In other words, the first low-priority data includes the subdata 1-0 and the subdata 1-1.

That the second low-priority data includes data formed by continuous bit streams output subsequently after the second code block group is encoded may be that, the second low-priority data includes data formed by continuous bit streams output subsequently after the CB (C-2) and the CB (C-1) are encoded. In other words, the second low-priority data includes the subdata 1-(C-2) and the subdata 1-(C-1).

Therefore, the first subdata includes the first high-priority data and the second high-priority data. In other words, the first subdata includes the subdata 0-0, the subdata 0-1, the subdata 0-(C-2), and the subdata 0-(C-1). It should be noted that, the foregoing subdata may be sorted in ascending or descending order of CB indexes, or may be sorted in another order (for example, interleaving is performed between subdata), and this is not limited in the present disclosure.

The second subdata includes the first low-priority data and the second low-priority data. In other words, the second subdata includes the subdata 1-0, the subdata 1-1, the subdata 1-(C-2), and the subdata 1-(C-1). Similarly, the foregoing subdata may be sorted in ascending or descending order of CB indexes, or may be sorted in another order (for example, interleaving is performed between subdata), and this is not limited in the present disclosure.

In one embodiment, the first high-priority data and/or the first low-priority data are/is a continuous part in the data obtained after the first code block group is encoded.

In one embodiment, a start location of the first high-priority data is a preset location in the continuous bit streams after the first code block group is encoded. For example, the start location of the first high-priority data is a start bit (that is, a first bit) in the continuous bit streams after the first code block group is encoded. For another example, the start location of the first high-priority data is a location corresponding to the redundancy version RV0 in the continuous bit streams after the first code block group is encoded. The start location of the first high-priority data may alternatively be another preset location, and is not limited in the present disclosure.

In one embodiment, system bits included in the first high-priority data are no fewer than system bits included in the first low-priority data. In other words, system bits in the data that is obtained after the first code block group is encoded and that is included in the first subdata are more than or equal to system bits in the data that is obtained after the first code block group is encoded and that is included in the second subdata.

In one embodiment, the start locations of the first high-priority data and the first low-priority data in the continuous bit streams after the first code block group is encoded are the same.

In one embodiment, the start locations of the first high-priority data and the first low-priority data in the continuous bit streams after the first code block group is encoded are different.

In one embodiment, the start location of the first high-priority data and the start location of the first low-priority data respectively correspond to start locations of different redundancy versions RV in the continuous bit streams after the first code block group is encoded. For example, the start location of the first high-priority data is the location corresponding to the redundancy version RV0 in the continuous bit streams after the first code block group is encoded, and the start location of the first low-priority data is the location of the redundancy version RV2 in the continuous bit streams after the first code block group is encoded.

In one embodiment, a bit corresponding to the start location of the first low-priority data and a bit corresponding to an end location of the first high-priority data are continuous in the continuous bit streams after the first code block group is encoded.

In one embodiment, bits included in the first high-priority data do not overlap bits included in the first low-priority data, and the bit corresponding to the start location of the first low-priority data and the bit corresponding to the end location of the first high-priority data are discontinuous in the continuous bit streams after the first code block group is encoded.

In one embodiment, the bits included in the first high-priority data partially overlap the bits included in the first low-priority data, that is, the start location of the first low-priority data is located in the first high-priority data.

In one embodiment, the start location of the first high-priority data and/or the start location of the first low-priority data in the continuous bit streams after the first code block group is encoded are/is specified by the communications system. In one embodiment, the start location of the first high-priority data and/or the start location of the first low-priority data in the continuous bit streams after the first code block group is encoded are/is pre-indicated by the network device.

In one embodiment, the second high-priority data and/or the second low-priority data are/is a continuous part in the data obtained after the second code block group is encoded.

In one embodiment, a start location of the second high-priority data is a preset location in the continuous bit streams after the second code block group is encoded. For example, the start location of the second high-priority data is a start bit (that is, a first bit) in the continuous bit streams after the second code block group is encoded. For another example, the start location of the second high-priority data is a location corresponding to the redundancy version RV0 in the continuous bit streams after the second code block group is encoded. The start location of the second high-priority data may alternatively be another preset location, and is not limited in the present disclosure.

In one embodiment, system bits included in the second high-priority data are no fewer than system bits included in the second low-priority data. In other words, system bits in the data that is obtained after the second code block group is encoded and that is included in the first subdata are more than or equal to system bits in the data that is obtained after the second code block group is encoded and that is included in the second subdata.

In one embodiment, the start locations of the second high-priority data and the second low-priority data in the continuous bit streams after the second code block group is encoded are the same.

In one embodiment, the start locations of the second high-priority data and the second low-priority data in the continuous bit streams after the second code block group is encoded are different.

In one embodiment, the start location of the second high-priority data and the start location of the second low-priority data respectively correspond to start locations of different redundancy versions RV in the continuous bit streams after the second code block group is encoded. For example, the start location of the second high-priority data is the location corresponding to the redundancy version RV0 in the continuous bit streams after the second code block group is encoded, and the start location of the second low-priority data is the location of the redundancy version RV2 in the continuous bit streams after the second code block group is encoded.

In one embodiment, a bit corresponding to the start location of the second low-priority data and a bit corresponding to an end location of the second high-priority data are continuous in the continuous bit streams after the second code block group is encoded.

In one embodiment, bits included in the second high-priority data do not overlap bits included in the second low-priority data, and the bit corresponding to the start location of the second low-priority data and the bit corresponding to the end location of the second high-priority data are discontinuous in the continuous bit streams after the second code block group is encoded.

In one embodiment, the bits included in the second high-priority data partially overlap the bits included in the second low-priority data, that is, the start location of the second low-priority data is located in the second high-priority data.

In one embodiment, the start location of the second high-priority data and/or the start location of the second low-priority data in the continuous bit streams after the second code block group is encoded are/is specified by the communications system. In one embodiment, the start location of the second high-priority data and/or the start location of the second low-priority data in the continuous bit streams after the first code block group is encoded are/is pre-indicated by the network device.

In one embodiment, a size of the first high-priority data included in the first subdata or a size of the second high-priority data included in the first subdata is determined based on a size of a resource included in the first subband and a quantity of code block groups included in the first TB.

In one embodiment, a size of the resource that is occupied in the first subband by the first high-priority data or the second high-priority data included in the first subdata is determined based on the size of the resource included in the first subband and the quantity of code block groups included in the first TB.

In one embodiment, the resource included in the first subband is a resource occupied by the first time-frequency resource in the first subband. In one embodiment, the resource included in the first subband is a resource occupied by the first time-frequency resource in the first subband for transmitting the first subdata. In other words, the resource included in the first subband does not include a resource occupied by the first time-frequency resource in the first subband for transmitting other information, such as a reference signal.

It may be understood that, in this implementation solution of the present disclosure, the first subdata is sent by using the resource occupied by the first time-frequency resource in the first subband, where the first subdata may include the first high-priority data obtained after the first code block group is encoded and second high-priority data obtained after the second code block group is encoded. To enable all of the high-priority data of the plurality of code block groups corresponding to the first subdata to be sent by using the resource occupied by the first time-frequency resource in the first subband, a resource that can be occupied by each code block group may be determined based on the size of the resource included in the first subband and the quantity of code block groups corresponding to the first subdata. For example, in an implementation, resources included in the first subband are averagely allocated to the code block groups corresponding to the first subdata, so that the code block groups are transmitted by using an approximately same quantity of resources. In another implementation, the resources included in the first subband are allocated based on a size (for example, a size of an included original information bit) or a priority (for example, more resources are allocated to a higher-priority code block group) of each code block group. There may also be another implementation in the present disclosure, and this is not limited in the present disclosure.

In one embodiment, a manner of determining the size of the resource that is occupied by each code block in a code block group and that is included in the first subdata is described below by using the first code block group as an example. It is assumed that resources allocated to the first code block group are denoted as resources #1. When the first code block group includes one code block, all of the resources #1 are used to transmit the code block included in the first code block group. When the first code block group includes at least two code blocks, to enable all of the plurality of code blocks included in the first code block group to be sent by using the resources #1, resources that can be occupied by each code block may be determined based on a size of the resources #1 and a quantity of code blocks included in the first code block group. For example, in an implementation, the resources #1 are averagely allocated to the code blocks included in the first code block group, so that the code blocks are transmitted by using an approximately same quantity of resources. In another implementation, the resources #1 are allocated based on a size (for example, a size of an included original information bit) or a priority (for example, more resources are allocated to a higher-priority code block) of each code block. There may also be another implementation in the present disclosure, and this is not limited in the present disclosure.

In one embodiment, a size of the first low-priority data included in the second subdata or a size of the second low-priority data included in the second subdata is determined based on a size of a resource included in the second subband and a quantity of code block groups included in the first TB.

In one embodiment, a size of the resource that is occupied in the first subband by the first low-priority data or the second low-priority data included in the second subdata is determined based on the size of the resource included in the second subband and the quantity of code block groups included in the first TB.

In one embodiment, the resource included in the second subband is a resource occupied by the first time-frequency resource in the second subband. In one embodiment, the resource included in the second subband is a resource occupied by the first time-frequency resource in the second subband for transmitting the second subdata. In other words, the resource included in the second subband does not include a resource occupied by the first time-frequency resource in the second subband for transmitting other information, such as a reference signal.

It should be noted that, a manner of determining the size of the first low-priority data included in the second subdata or the size of the second low-priority data included in the second subdata, or a manner of determining the size of the resource that is occupied in the second subband by the first low-priority data or the second low-priority data included in the second subdata, or a manner of determining the size of the resource that is occupied by each code block in a code block group and that is included in the second subdata may be similar to the foregoing manner of determining the size of the first high-priority data included in the first subdata or the size of the second high-priority data included in the first subdata, or a manner of determining the size of the resource that is occupied in the second subband by the first high-priority data or the second high-priority data included in the first subdata, or a manner of determining the size of the resource that is occupied by each code block in a code block group and that is included in the first subdata. Details are not described herein again.

In this embodiment, the first data is divided into high-priority subdata and low-priority subdata, so that the receiving device preferentially processes the high-priority subdata during processing, to reduce a processing latency during channel demodulation, and improve processing efficiency of the system.

The first subdata and the second subdata are described in detail above by using the example in which the first TB includes one TB. The first subdata and the second subdata when the first TB includes a plurality of TBs (for example, at least two TBs) are described below. Without loss of generality, it is assumed that the first TB includes two TBs, and the two TBs are respectively a TB #1 and a TB #2. If the first TB includes more than two TBs, expansion may be performed based on a similar principle, and details are not described herein again.

It should be noted that, if the TB #1 and the TB #2 are transmitted in a spatial multiplexing manner, a case in which the first TB includes one TB may be independently expanded to a case in which the first TB includes two TBs, and details are not described herein again.

In one embodiment, the TB #1 and the TB #2 respectively correspond to original information of different priorities, or, the TB #1 and the TB #2 respectively correspond to original information of different types. It is assumed that a priority of the TB #1 is higher than that of the TB #2, that is, importance of the TB #1 is higher than that of the TB #2. For example, the TB #1 is control information, and the TB #2 is normal service data. For another example, the TB #1 is service data of URLLC, and the TB #2 is normal service data. For another example, the TB #1 is service data of URLLC, and the TB #2 is control information. For another example, in some scenarios, the TB #1 is control information (for example, HARQ feedback information), and the TB #2 is service data of URLLC. This is mainly because URLLC data information carries a service needing ultra reliable low latency communication. In wireless communication transmission, ultra reliable low latency transmission of URLLC data needs to be ensured, and therefore a priority of the URLLC data is high. For the control information, (uplink control information or downlink control information, for example, scheduling information or feedback information), there is usually no retransmission. Therefore, a priority of the control information is also higher than that of data information. It should be understood that, the foregoing example of priority is merely an example for description, and priorities of original information of different types may alternatively be distinguished from another dimension, and this is not limited in the present disclosure.

In one embodiment, the priorities of original information of different types/services are specified by the communications system. In one embodiment, the priorities of original information of different types/services are pre-indicated by the network device by using signaling (for example, higher layer signaling or physical layer signaling).

It should be noted that, when a size of an original information bit corresponding to the TB #1 or the TB #2 is small, for example, when the TB #1 or the TB #2 is downlink or uplink HARQ feedback information, information of only one or several bits may need to be transmitted. In this case, if a CRC adding operation is further performed, unnecessary redundant information is introduced, and overheads are increased. Consequently, performance decreases. Therefore, in this case, a CRC bit may not be added.

In one embodiment, the first subdata includes data formed by continuous bit streams output after the TB #1 is encoded, and the second subdata includes data formed by continuous bit streams output after the TB #2 is encoded.

In one embodiment, the first subdata includes all bits in to-be-transmitted continuous bit streams after the TB #1 is encoded, and third high-priority data obtained after the TB #2 is encoded. The second subdata includes third low-priority data obtained after the TB #2 is encoded. The third high-priority data includes data formed by continuous bit streams output first after the TB #2 is encoded. The third low-priority data includes data formed by continuous bit streams output subsequently after the TB #2 is encoded.

In one embodiment, the first subdata includes fourth high-priority data obtained after the TB #1 is encoded, and third high-priority data obtained after the TB #2 is encoded. The second subdata includes fourth low-priority data obtained after the TB #1 is encoded and third low-priority data obtained after the TB #2 is encoded. The fourth high-priority data includes data formed by continuous bit streams output first after the TB #1 is encoded. The fourth low-priority data includes data formed by continuous bit streams output subsequently after the TB #1 is encoded. The third high-priority data includes data formed by continuous bit streams output first after the TB #2 is encoded. The third low-priority data includes data formed by continuous bit streams output subsequently after the TB #2 is encoded.

In one embodiment, the TB #1 includes one CB. The TB #2 includes the first code block group and the second code block group. The first subdata and the second subdata include at least one of the following cases:

the first subdata includes all the bits in the to-be-transmitted continuous bit streams after the TB #1 is encoded, the first high-priority data obtained after the first code block group is encoded, and the second high-priority data obtained after the second code block group is encoded;

the second subdata includes the first low-priority data obtained after the first code block group is encoded and the second low-priority data obtained after the second code block group is encoded;

the first subdata includes the fourth high-priority data obtained after the TB #1 is encoded, the first high-priority data obtained after the first code block group is encoded, and the second high-priority data obtained after the second code block group is encoded;

the second subdata includes the fourth low-priority data obtained after the TB #1 is encoded, the first low-priority data obtained after the first code block group is encoded, and the second low-priority data obtained after the second code block group is encoded;

the first subdata includes all the bits in the to-be-transmitted continuous bit streams after the TB #1 is encoded and the data obtained after the first code block group is encoded, and does not include the data obtained after the second code block group is encoded; and the second subdata includes the data obtained after the second code block group is encoded, and does not include the data obtained after the first code block group is encoded.

Priorities of at least two pieces of subdata are described in the foregoing embodiment by using the first subdata and the second subdata as an example. It may be understood that, when the first data includes more than two pieces of subdata, for example, when the first data includes three pieces of subdata, priories of the three pieces of subdata may be determined in a similar manner.

In S203, the first device sends the first subdata by using the first subband occupied by the first time-frequency resource, and sends the second subdata by using the second subband occupied by the first time-frequency resource. The first device may map the data to the subbands in at least one of the following manners:

1) the first device maps the first subdata to the first subband based on a first-frequency-then-time sequence;

2) the first device maps the first subdata to the first subband based on a first-time-then-frequency sequence;

3) the first device maps a first part in the first subdata to the first subband based on a first-frequency-then-time sequence, and maps a second part in the first subdata to the first subband based on a first-time-then-frequency sequence, where the first part in the first subdata and the second part in the first subdata respectively correspond to original information of different priorities or different types;

4) the first device maps the second subdata to the second subband based on a first-frequency-then-time sequence;

5) the first device maps the second subdata to the second subband based on a first-time-then-frequency sequence; and 6) the first device maps a first part in the second subdata to the second subband based on a first-frequency-then-time sequence, and maps a second part in the second subdata to the second subband based on a first-time-then-frequency sequence, where the first part in the second subdata and the second part in the second subdata respectively correspond to original information of different priorities or different types.

It should be understood that, when the first subdata or the second subdata includes original information of at least two different priorities or different types, for example, the first part in the first subdata and the second part in the first subdata respectively correspond to different original information, data corresponding to one type of information in the first subdata may puncture data corresponding to another type of information in the first subdata in a puncturing manner. In this case, data corresponding to different information is mapped in different mapping sequences (for example, data corresponding to one type of information is mapped in a first-frequency-then-time sequence, and data corresponding to another type of information is mapped in a first-time-then-frequency sequence), to prevent some bits from being continuously punctured from punctured data, so that the punctured data has a higher probability of being correctly decoded.

It should also be understood that, that the device maps the subdata to the subbands may be that the device maps some or all of data in the subdata to the subbands. For example, that the first device maps the first subdata to the first subband may be that: the first device maps some of data in the first subdata to the first subband, or the first device maps all of data in the first subdata to the first subband. Correspondingly, that the first device sends the first subdata by using the first subband occupied by the first time-frequency resource may be that: the first device sends some of data in the first subdata by using the first subband occupied by the first time-frequency resource, or the first device sends all of data in the first subdata by using the first subband occupied by the first time-frequency resource. Descriptions of same or similar cases are omitted below to avoid repetition.

A manner of mapping data based on a subband is described below by using examples. FIG. 6 shows a method for mapping data based on a subband. As shown in FIG. 6, the first time-frequency resource occupies a subband 1 and a subband 2. The first time-frequency resource occupies, in the subband 1, seven symbols in time domain, four subcarriers in frequency domain, and a total of 28 resource elements RE. The first time-frequency resource occupies, in the subband 2, seven symbols in time domain, four subcarriers in frequency domain, and a total of 28 REs. It should be understood that, to facilitate description, all of the REs included in the first time-frequency resource are used for data mapping. Sequence numbers corresponding to data included in the first subdata are 1 to 28, and sequence numbers corresponding to data included in the second subdata are 29 to 56, where sequence numbers corresponding to data indicate mapping sequences. The data included in the first subdata or the second subdata may be symbols after modulation (for example, QPSK modulation, 16QAM modulation, 64QAM modulation, or 256QAM modulation), or bits obtained after encoding and before modulation, or symbols after DFT modulation. This is not limited in the present disclosure.

As shown in the figure, the first device maps the first subdata to the first subband in a first-frequency-then-time sequence. In other words, when the first subdata 1 to 28 is mapped to the subband 1, the first to the fourth subcarriers on the first symbol in the subband 1 are first mapped, and then the first to the fourth subcarriers on the second symbol are mapped, and so on, until the 28 pieces of data are mapped to the 28 REs in the first subband. The first device maps the second subdata to the second subband based on a first-frequency-then-time sequence in a same manner.

Figure 7:
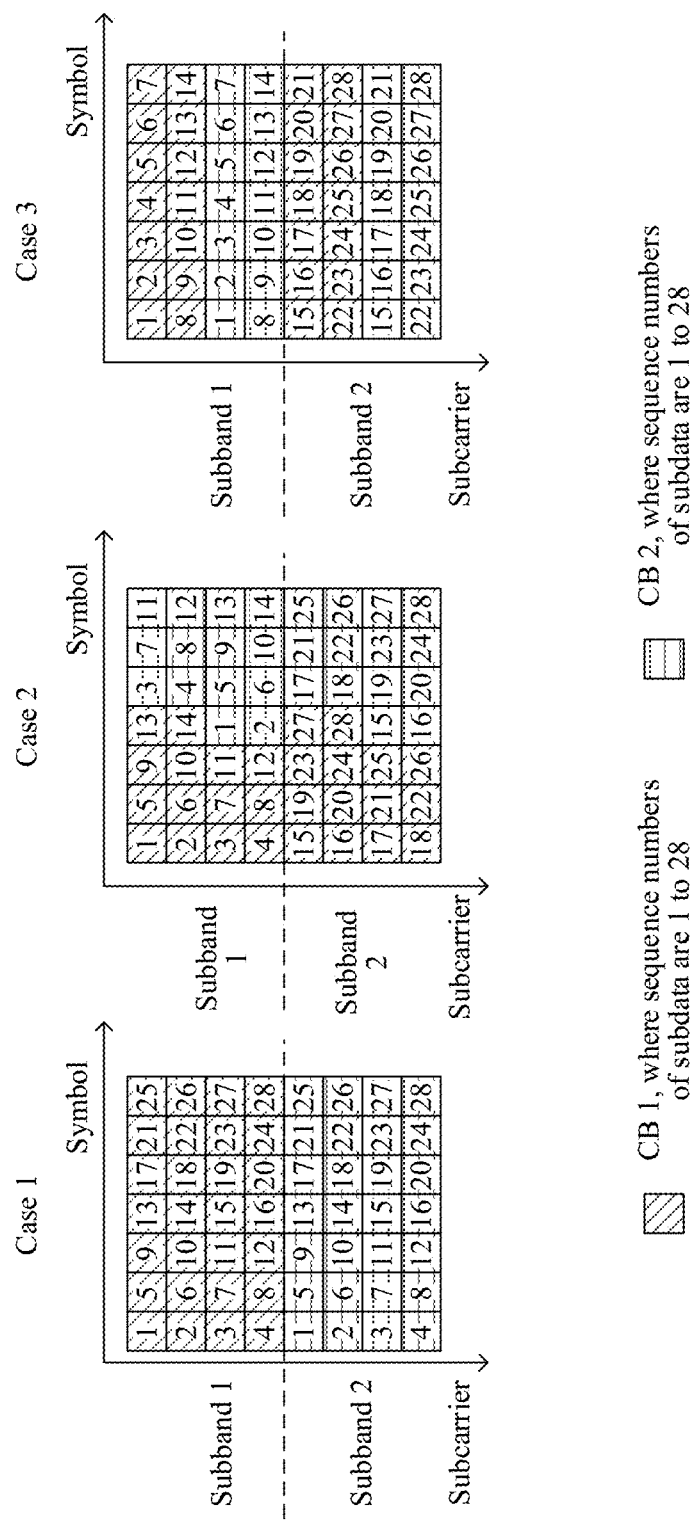
FIG. 7 is a schematic diagram of another data mapping method based on subbands according to the present disclosure.

FIG. 7 shows a method for mapping data based on a subband when the first TB includes at least two code block groups CBG. As shown in FIG. 7, the first TB includes two CBGs. Each of the two CBGs includes one CB, respectively a CB 1 and a CB 2 (or the first TB includes two CBs, that is, the CB 1 and the CB 2). Sequence numbers corresponding to data obtained after the CB 1 is encoded are 1 to 28, and sequence numbers corresponding to data obtained after the CB 2 is encoded are also 1 to 28. Mapping the data obtained after the CB 1 and the CB 2 are encoded to the subband 1 and the subband 2 includes the following three cases.

Case 1: The first subdata includes the data obtained after the CB 1 is encoded, and does not include the data obtained after the CB 2 is encoded, and the second subdata includes the data obtained after the CB 2 is encoded, and does not include the data obtained after the CB 1 is encoded.

As shown in the figure, the first device maps the first subdata to the first subband in a first-frequency-then-time sequence. In other words, when the data 1 to 28 after the CB 1 is encoded is mapped to the subband 1, the first to the fourth subcarriers on the first symbol in the subband 1 are first mapped, and then the first to the fourth subcarriers on the second symbol are mapped, and so on, until the 28 pieces of data are mapped to the 28 REs in the first subband. The first device maps the second subdata to the second subband in a first-frequency-then-time sequence. In other words, when the data 1 to 28 after the CB 2 is encoded is mapped to the subband 2, the first to the fourth subcarriers on the first symbol in the subband 2 are first mapped, and then the first to the fourth subcarriers on the second symbol are mapped, and so on, until the 28 pieces of data are mapped to the 28 REs in the second subband.

Case 2: The first subdata includes data formed by continuous bit streams output first after the CBG 1 is encoded (that is, the data 1 to 14 obtained after the CB 1 is encoded) and data formed by continuous bit streams output first after the CBG 2 is encoded (that is, the data 1 to 14 obtained after the CB 2 is encoded). The size of the data formed by the continuous bit streams output first after the CBG 1 or the CBG 2 is encoded is determined based on a size of a resource occupied by the first time-frequency resource in the first subband and a quantity of CBGs. For example, resources occupied in the first subband, that is, 28 REs, are averagely allocated to two CBGs, and resources that can be occupied by each CBG are 14 REs.

Similarly, the second subdata includes data formed by continuous bit streams output subsequently after the CBG 1 is encoded (that is, the data 15 to 28 obtained after the CB 1 is encoded) and data formed by continuous bit streams output subsequently after the CBG 2 is encoded (that is, the data 15 to 28 obtained after the CB 2 is encoded). The size of the data formed by the continuous bit streams output subsequently after the CBG 1 or the CBG 2 is encoded is determined based on the size of the resource occupied by the first time-frequency resource in the first subband and the quantity of CBGs.

As shown in the figure, the first device maps the first subdata to the first subband in a first-frequency-then-time sequence. In other words, when the data 1 to 14 obtained after the CB 1 is encoded is mapped to the subband 1, the first to the fourth subcarriers on the first symbol in the subband 1 are first mapped, and then the first to the fourth subcarriers on the second symbol are mapped, and so on, until the 14 pieces of data are mapped to the first subband, and then the data 1 to 14 obtained after the CB 2 is encoded is subsequently mapped to the subband 1 based on a same rule. The first device maps the second subdata to the second subband in a first-frequency-then-time sequence. In other words, when the data 15 to 28 obtained after the CB 1 is encoded is mapped to the subband 2, the first to the fourth subcarriers on the first symbol in the subband 2 are first mapped, and then the first to the fourth subcarriers on the second symbol are mapped, and so on, until the 14 pieces of data are mapped to the second subband, and then the data 15 to 28 obtained after the CB 2 is encoded is subsequently mapped to the subband 2 based on a same rule.

Case 3: The first subdata includes data formed by continuous bit streams output first after the CBG 1 is encoded (that is, the data 1 to 14 obtained after the CB 1 is encoded) and data formed by continuous bit streams output first after the CBG 2 is encoded (that is, the data 1 to 14 obtained after the CB 2 is encoded). The size of the data formed by the continuous bit streams output first after the CBG 1 or the CBG 2 is encoded is determined based on a size of a resource occupied by the first time-frequency resource in the first subband and a quantity of CBGs. For example, resources occupied in the first subband, that is, 28 REs, are averagely allocated to two CBGs, and resources that can be occupied by each CBG are 14 REs.

Similarly, the second subdata includes data formed by continuous bit streams output subsequently after the CBG 1 is encoded (that is, the data 15 to 28 obtained after the CB 1 is encoded) and data formed by continuous bit streams output subsequently after the CBG 2 is encoded (that is, the data 15 to 28 obtained after the CB 2 is encoded). The size of the data formed by the continuous bit streams output subsequently after the CBG 1 or the CBG 2 is encoded is determined based on the size of the resource occupied by the first time-frequency resource in the first subband and the quantity of CBGs.

As shown in the figure, the first device maps the first subdata to the first subband in a first-time-then-frequency sequence. In other words, when the data 1 to 14 obtained after the CB 1 is encoded is mapped to the subband 1, the first to the seventh symbols corresponding to the first subcarrier in the subband 1 are first mapped, and then the first to the seventh symbols corresponding to the second subcarrier are mapped, and so on, until the 14 pieces of data are mapped to the first subband, and then the data 1 to 14 obtained after the CB 2 is encoded is subsequently mapped to the subband 1 based on a same rule. The first device maps the second subdata to the second subband in a first-time-then-frequency sequence. In other words, when the data 15 to 28 obtained after the CB 1 is encoded is mapped to the subband 2, the first to the seventh symbols corresponding to the first subcarrier in the subband 2 are first mapped, and then the first to the seventh symbols corresponding to the second subcarrier are mapped, and so on, until the 14 pieces of data are mapped to the second subband, and then the data 15 to 28 obtained after the CB 2 is encoded is subsequently mapped to the subband 2 based on a same rule.

By using the foregoing embodiment, when wireless communication is performed in the communications system by using a carrier with a large system bandwidth, a sending device divides encoded data into a plurality of pieces of subdata, and respectively maps the plurality of pieces of subdata to a plurality of subbands for transmission. Therefore, a requirement posed on the sending device and/or the receiving device to have a high-bandwidth processing capability may be reduced, and implementation complexity is reduced.

Corresponding to the foregoing method, the present disclosure provides a data sending apparatus. The data sending apparatus may be the first device in the foregoing method embodiment, and is configured to send data to the second device, and may also be referred to as a sending device or a sending end. The data sending apparatus may perform the operations in the foregoing embodiment.

Figure 8:
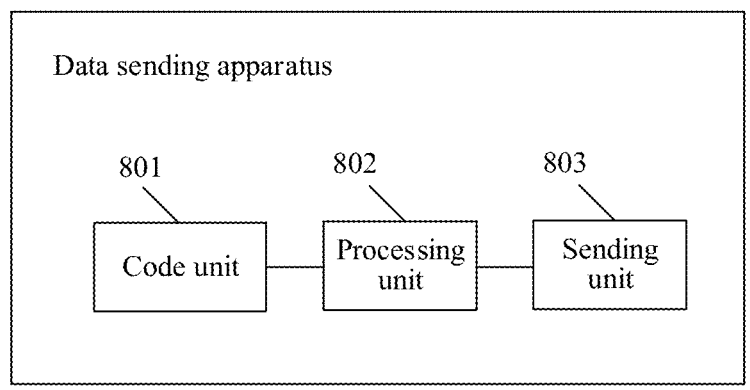
FIG. 8 is a schematic structural diagram of an embodiment of a data sending apparatus according to the present disclosure.

Referring to FIG. 8, in an embodiment, the data sending apparatus includes:

a code unit 801, configured to obtain first data, where the first data includes data obtained after a first transport block is encoded, the first data includes at least two pieces of subdata, and the at least two pieces of subdata include first subdata and second subdata;

a processing unit 802, configured to determine a first time-frequency resource used to transmit the first data, where the first time-frequency resource occupies at least two subbands, and the at least two subbands include a first subband and a second subband; and a sending unit 803, configured to: send the first subdata by using the first subband occupied by the first time-frequency resource, and send, by the first device, the second subdata by using the second subband occupied by the first time-frequency resource.

In an implementation, the sending unit is configured to send, based on a first-frequency-domain-then-time-domain mapping sequence, the first subdata by using the first subband occupied by the first time-frequency resource.

In an implementation, the sending unit is configured to send, based on a first-frequency-domain-then-time-domain mapping sequence, the second subdata by using the second subband occupied by the first time-frequency resource.

Refer to related descriptions of the part of the foregoing method embodiment for the first data, the first time-frequency resource, the first subdata, the second subdata, and methods for mapping and sending the first subdata and the second subdata.

The data sending apparatus may be the first device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

Figure 9:
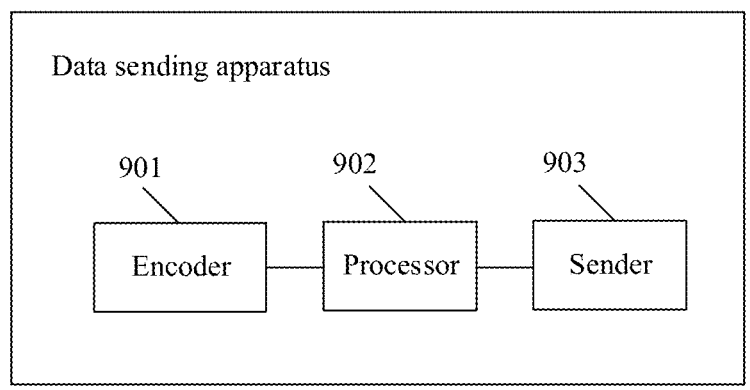
FIG. 9 is a schematic structural diagram of another embodiment of a data sending apparatus according to the present disclosure.

Referring to FIG. 9, hardware elements of the data sending apparatus include:

an encoder 901, configured to obtain first data, where the first data includes data obtained after a first transport block is encoded, the first data includes at least two pieces of subdata, and the at least two pieces of subdata include first subdata and second subdata;

a processing unit 902, configured to determine a first time-frequency resource used to transmit the first data, where the first time-frequency resource occupies at least two subbands, and the at least two subbands include a first subband and a second subband; and a sender 903, configured to: send the first subdata by using the first subband occupied by the first time-frequency resource, and send, by the first device, the second subdata by using the second subband occupied by the first time-frequency resource.

In one embodiment, the sender may also be a transceiver physically.

In an implementation, the sender is configured to send, based on a first-frequency-domain-then-time-domain mapping sequence, the first subdata by using the first subband occupied by the first time-frequency resource.

In an implementation, the sender is configured to send, based on a first-frequency-domain-then-time-domain mapping sequence, the second subdata by using the second subband occupied by the first time-frequency resource.

Refer to related descriptions of the part of the foregoing method embodiment for the first data, the first time-frequency resource, the first subdata, the second subdata, and methods for mapping and sending the first subdata and the second subdata.

The data sending apparatus may be the first device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

Corresponding to the foregoing method, the present disclosure provides a data receiving apparatus. The data receiving apparatus may be the second device in the foregoing method embodiment, and is configured to receive data from the first device, and may also be referred to as a receiving device or a receiving end. The data receiving apparatus may perform the operations in the foregoing embodiment.

Figure 10:
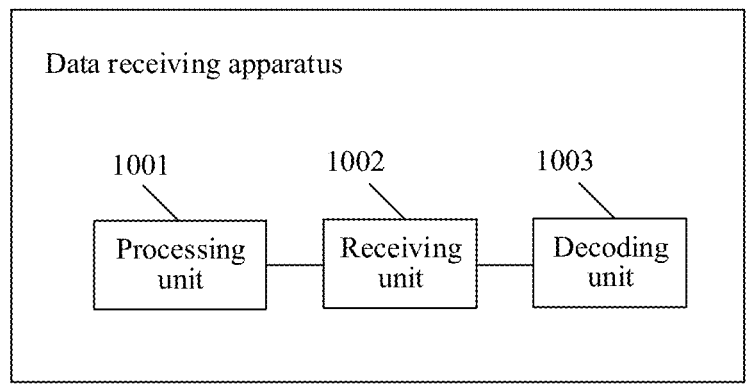
FIG. 10 is a schematic structural diagram of an embodiment of a data receiving apparatus according to the present disclosure.

Referring to FIG. 10, in an embodiment, the data receiving apparatus includes:

a processing unit 1001, configured to determine a first time-frequency resource, where the first time-frequency resource occupies at least two subbands, and the at least two subbands include a first subband and a second subband;

a receiving unit 1002, configured to receive first data on the first time-frequency resource, where the first data includes at least two pieces of subdata, the at least two pieces of subdata include first subdata and second subdata, the receiving unit receives the first subdata by using the first subband occupied by the first time-frequency resource, and receives the second subdata by using the second subband occupied by the first time-frequency resource; and a decoding unit 1003, configured to decode, by the second device, the first data, to obtain a first transport block (TB).

In an implementation, the receiving unit receives, based on a first-frequency-domain-then-time-domain sequence, the first subdata by using the first subband occupied by the first time-frequency resource.

In an implementation, the receiving unit receives, based on a first-frequency-domain-then-time-domain sequence, the second subdata by using the second subband occupied by the first time-frequency resource.

Refer to related descriptions of the part of the foregoing method embodiment for the first data, the first time-frequency resource, the first subdata, the second subdata, and methods for mapping and sending the first subdata and the second subdata.

The data receiving apparatus may be the second device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

Figure 11:
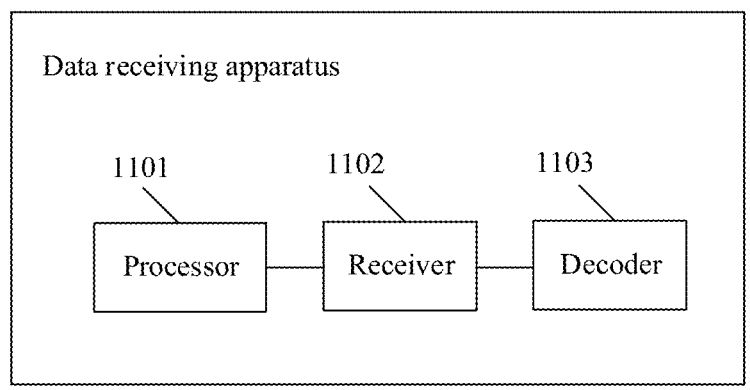
FIG. 11 is a schematic structural diagram of another embodiment of a data receiving apparatus according to the present disclosure.

Referring to FIG. 11, hardware elements of the data receiving apparatus include:

a processor 1101, configured to determine a first time-frequency resource, where the first time-frequency resource occupies at least two subbands, and the at least two subbands include a first subband and a second subband;

a receiver 1102, configured to receive first data on the first time-frequency resource, where the first data includes at least two pieces of subdata, the at least two pieces of subdata include first subdata and second subdata, the receiving unit receives the first subdata by using the first subband occupied by the first time-frequency resource, and receives the second subdata by using the second subband occupied by the first time-frequency resource; and a decoder 1103, configured to decode, by the second device, the first data, to obtain a first transport block (TB).

In an implementation, the receiver receives, based on a first-frequency-domain-then-time-domain sequence, the first subdata by using the first subband occupied by the first time-frequency resource.

In an implementation, the receiver receives, based on a first-frequency-domain-then-time-domain sequence, the second subdata by using the second subband occupied by the first time-frequency resource.

Refer to related descriptions of the part of the foregoing method embodiment for the first data, the first time-frequency resource, the first subdata, the second subdata, and methods for mapping and sending the first subdata and the second subdata.

The data receiving apparatus may be the second device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

It should be understood that, the foregoing method and apparatus embodiments may be applied to a licensed spectrum system, or a grant-free spectrum system. In other words, the first time-frequency resource may be a time-frequency resource on a licensed spectrum, or a time-frequency resource on a grant-free spectrum. The first time-frequency resource determined by the first device is a time-frequency resource scheduled by the system (or the network device). When the first time-frequency resource is a time-frequency resource on a licensed spectrum, the first device may send data by using the first time-frequency resource. In other words, the first time-frequency resource is also a resource actually used for sending data by the first device. When the first time-frequency resource is a time-frequency resource on a grant-free spectrum, the first device needs to first determine, through channel detection, whether bands in which the first time-frequency resource is located are available. If the bands in which the first time-frequency resource is located are all available, the first device may send data by using the first time-frequency resource. That is, the first time-frequency resource is also a resource actually used for sending data by the first device. If only some of the bands in which the first time-frequency resource is located are available, the present disclosure may further include the following transmission scheme on a grant-free spectrum. It should be noted that, the resource mapping method provided in this embodiment of the present disclosure may also be used in combination with the following transmission scheme on a grant-free spectrum.

Embodiment 2

With evolution of communications technologies, a communications device may perform communication transmission on a grant-free spectrum resource in a manner of a large bandwidth. For example, a bandwidth of a carrier is 80 M. A frequency resource of the carrier may be divided into a plurality of subbands. One physical channel may be transmitted on the plurality of subbands. Before transmission, the communications device may perform listen before talk (LBT) on subbands, that is, independently perform LBT on each subband, to determine an available subband in a system, to perform data transmission in the available subband. If resources allocated by a base station for transmitting a physical channel occupy a plurality of subbands, but subbands on which the device successfully performs LBT before transmission are fewer than subbands allocated by the base station, resources used for sending the physical channel are reduced. In this case, a method for mapping and sending a physical channel needs to be considered.

Figure 12:
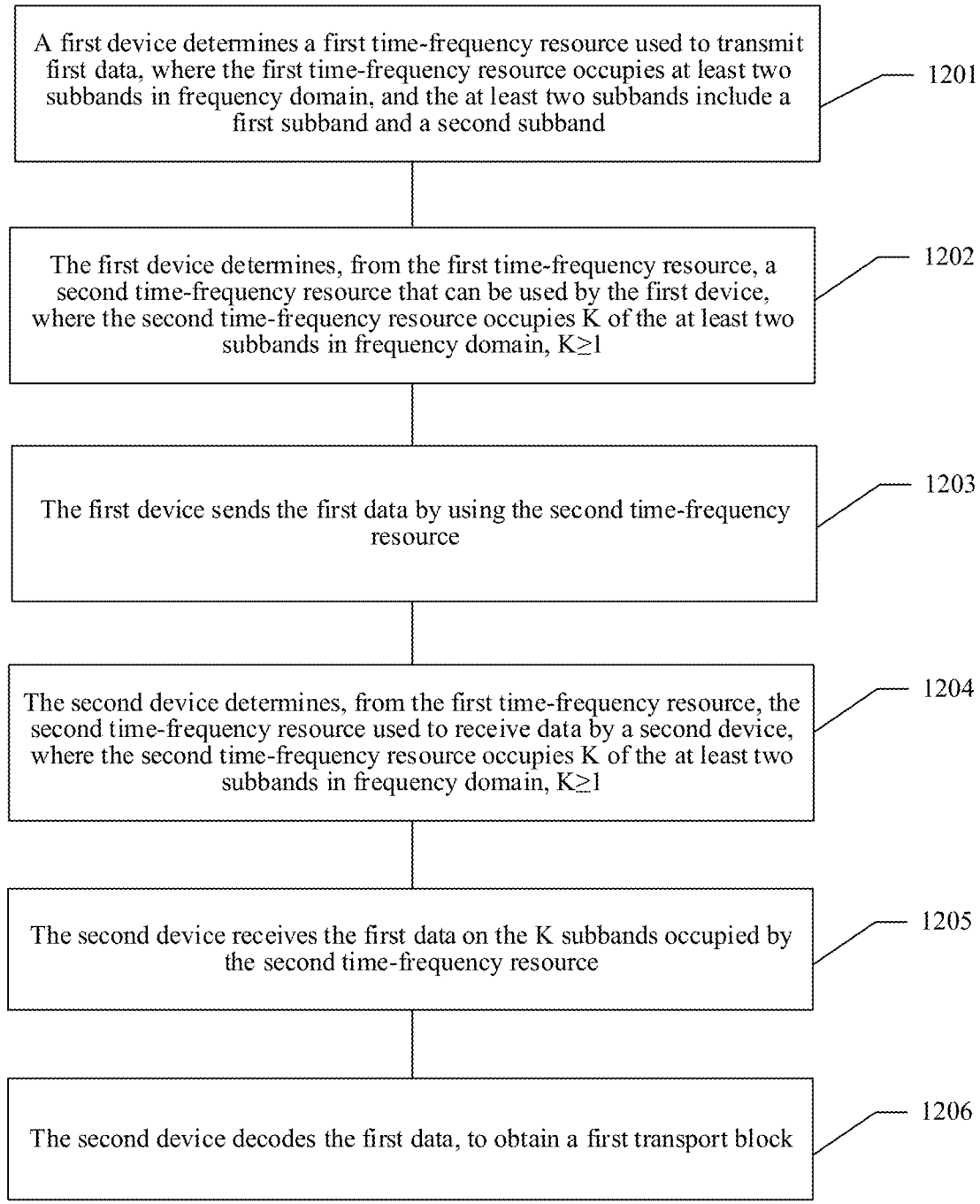
FIG. 12 is a schematic flowchart of another embodiment of a data sending method according to the present disclosure.

FIG. 12 shows another embodiment of a data sending method provided in the present disclosure, and the data sending method includes the following operations.

Operation S1201: A first device determines a first time-frequency resource used to transmit first data, where the first time-frequency resource occupies at least two subbands in frequency domain, the at least two subbands include a first subband and a second subband, and the first data is data obtained by encoding a first transport block (TB).

In one embodiment, the first data includes data obtained after the first transport block is encoded.

In one embodiment, the first device is an access network device. The first data includes at least one of downlink data information, downlink control information, and downlink ultra reliable low latency communication (URLLC) data information, and the like. In one embodiment, the first data is sent by using a downlink physical channel, for example, a physical downlink data channel PDSCH or a physical downlink control channel PDCCH.

In one embodiment, the first device is a terminal device. The first data includes at least one of uplink data information, uplink control information, and uplink ultra reliable low latency communication (URLLC) data information, and the like. In one embodiment, the first data is sent by using an uplink physical channel, for example, a physical uplink data channel PUSCH or a physical uplink control channel PUCCH.

In one embodiment, the first TB includes one TB. In one embodiment, the first TB includes at least two TBs. The at least two TBs may be TBs of a same type of information, or TBs of different types of information. For example, the at least two TBs are TBs corresponding to downlink data information of a same service. For another example, the at least two TBs are TBs corresponding to downlink data information of different services (for example, one service is a normal service, and another service is a URLLC service). For another example, the at least two TBs are TBs corresponding to different information (for example, one type of information is data information, and another type of information is control information).

In one embodiment, the first time-frequency resource is a time-frequency resource that is allocated by the access network device by using scheduling information and that is used to carry the first data. In one embodiment, the first time-frequency resource is a resource that can be used only through contention. For example, the first time-frequency resource is a resource on a grant-free spectrum. When the first time-frequency resource is allocated by using the scheduling information, the scheduling information may be dynamic scheduling information, or half-static scheduling information. The network device may send the scheduling information to the terminal device by using a carrier on a licensed spectrum, or send the scheduling information to the terminal device by using a carrier on a grant-free spectrum. This is not particularly limited in the present disclosure.

In one embodiment, that the first time-frequency resource occupies at least two subbands may be that the first time-frequency resource occupies all of resources in the at least two subbands, or occupies some of the resources in the at least two subbands.

It should be noted that, refer to related descriptions in Embodiment 1 for implementation details of the first time-frequency resource, and details are not described herein again.

Operation S1202: The first device determines, from the first time-frequency resource, a second time-frequency resource that can be used by the first device, where the second time-frequency resource occupies K of the at least two subbands in frequency domain, K≥1.

In one embodiment, the first device determines the second time-frequency resource by performing channel detection on the at least two subbands. For example, the network device and/or the terminal device may detect whether a frequency domain resource having a bandwidth (for example, a subband) is in an idle status currently, or in other words, whether the frequency domain resource is used by another device.

If the frequency domain resource is in the idle status, or in other words, the frequency domain resource is not used by another device, the network device and/or the terminal device may perform communication, for example, uplink transmission or downlink transmission by using the frequency domain resource.

If the frequency domain resource is not in the idle status, or in other words, the frequency domain resource is already used by another device, the network device and/or the terminal device cannot use the frequency domain resource.

It should be noted that, in this embodiment of the present disclosure, a specific method and process of the foregoing contention mechanism may be similar to the prior art. To avoid repetition, detailed descriptions are omitted herein.

In one embodiment, the first device needs to perform channel detection on the at least two subbands occupied by the first time-frequency resource, to determine, from the at least two subbands, at least one subband that can be used by the first device. For example, the first device performs LBT detection on the at least two subbands, to determine, from the at least two subbands, the K subbands in the idle status.

Operation S1203: The first device sends the first data by using the second time-frequency resource.

The first device sends the first data to a second device by using the second time-frequency resource.

In one embodiment, the first device needs to perform channel detection on the at least two subbands occupied by the first time-frequency resource. If determining that both of the at least two subbands can be used, the first device sends the first data by using the at least two subbands occupied by the first time-frequency resource. If determining that only some of the at least two subbands can be used, the first device sends the first data by using the subbands that are in the first time-frequency resource and that can be used by the first device.

In one embodiment, the first device sends at least one type of the following information by using the second time-frequency resource:

the control information; and the data of the URLLC.

In one embodiment, the first device further sends a reference signal to the K subbands occupied by the second time-frequency resource.

In one embodiment, the first device sends indication information to the second device, where the indication information is used to indicate the K subbands.

Operation S1204: The second device determines, from the first time-frequency resource, the second time-frequency resource used to receive data by the second device, where the second time-frequency resource occupies K of the at least two subbands in frequency domain, K≥1.

In one embodiment, the second device receives the indication information sent by the first device, where the indication information is used to indicate the K subbands, so that the second device determines the K subbands based on the indication information.

In one embodiment, the second device can determine the K subbands by detecting a reference signal. For example, the second device detects each of the at least two subbands, determines whether the subband carries a reference signal, and determines K subbands carrying reference signals as subbands occupied by the second time-frequency resource in frequency domain.

Herein, a method and process of parsing, by the second device, information based on a reference signal may be similar to the prior art. To avoid repetition, detailed descriptions of the method and process are omitted herein.

Operation S1205: The second device receives the first data on the K subbands occupied by the second time-frequency resource.

In one embodiment, the second device receives at least one type of the following information by using the second time-frequency resource:

the control information; and the data of the URLLC.

Operation S1206: The second device decodes the first data, to obtain the first transport block (TB).

In this embodiment, during physical resource mapping, encoded modulation symbols are mapped in a first-frequency-domain-then-time-domain sequence in subbands. An advantage of this is that, when the sending device can transmit only some of scheduled subbands, demodulation performance of data transmitted on the subbands can be ensured.

In operation S1203, the first data includes at least two pieces of subdata, the at least two pieces of subdata include first subdata and second subdata, and the at least two subbands include a first subband and a second subband.

In one embodiment, the first time-frequency resource is a time-frequency resource scheduled by a system (or the network device). The first time-frequency resource includes at least resources in the first subband and the second subband. The first data includes the first subdata and the second subdata. The first subdata corresponds to the first subband. The second subdata corresponds to the second subband. To be specific, when LBT is performed successfully on all the subbands occupied by the first time-frequency resource, the first subdata is sent by using the resource occupied by the first time-frequency resource in the first subband, and the second subdata is sent by using the resource occupied by the first time-frequency resource in the second subband. It should be noted that, refer to related descriptions in Embodiment 1 for information included in the first subdata and the second subdata, a relationship between the first subdata and the second subdata, a manner of mapping the first subdata to the first subband, a manner of mapping the second subdata to the second subband, and the like. Details are not described herein again.

In one embodiment, a priority of the first subdata is higher than that of the second subdata.

In one embodiment, based on whether the K subbands include the first subband and/or the second subband, an operation of sending the first data by the first device may be one of the following cases.

Case 1: If the K subbands include the first subband and the second subband, that the first device sends the first data by using the second time-frequency resource includes: the first device sends the first subdata by using the first subband occupied by the second time-frequency resource, and the first device sends the second subdata by using the second subband occupied by the second time-frequency resource.

For example, a number of the first subband is 1, and a number of the second subband is 2. Then the first subdata is sent by using the subband whose number is 1, and the second subdata is sent by using the subband whose number is 2.

Case 2: If the K subbands include the first subband and do not include the second subband, that the first device sends the first data by using the second time-frequency resource includes: the first device sends the first subdata by using the first subband occupied by the second time-frequency resource.

In this case, the first subband used to send the first subdata is the same as the first subband used to send the first subdata in the case 1. For example, in the case 1, the first data is sent by using the subband whose number is 1, and in the case 2, the first data is also sent by using the subband whose number is 1.

Case 3: If the K subbands include the second subband and do not include the first subband, that the first device sends the first data by using the second time-frequency resource includes: the first device sends the first subdata by using the second subband occupied by the second time-frequency resource.

In this case, the first subband used to send the first subdata is different from the first subband used to send the first subdata in the case 1. For example, in the case 1, the first data is sent by using the subband whose number is 1, and in the case 3, the first data is sent by using the subband whose number is 2.

In one embodiment, in the case 2 and the case 3, a priority of the first subdata is higher than that of the second subdata, or, importance of the first subdata is higher than that of the second subdata. For example, the first subdata includes URLLC data information, the URLLC data information carries a service needing ultra reliable low latency communication, a burst URLLC emergency service may puncture an eMBB service that is already transmitted, so that a latency requirement of URLLC can be ensured, and therefore the priority is high. For another example, the first subdata includes control information, and there is usually no retransmission for the control information (scheduling information, feedback information, or the like), and therefore a priority of the control information is higher than that of data information. For another example, the first data includes system bits in encoded data. Because importance of system bits is higher than that of check bits in a decoding process, importance of the first subdata that carries more system bits is higher than that of the second subdata.

In one embodiment, when the first data includes system bits in URLLC data information, control information, and data information, it may be considered that a priority of the URLLC data information is the highest.

Therefore, in the case 2 and the case 3, when subbands obtained during channel detection are insufficient, it can be ensured that information of a high priority or high importance in the first data is transmitted.

In one embodiment, in the case 3, the first device maps the first subdata to the second subband in a manner of mapping the first subdata to the first subband.

In the case 3, in an implementation, the K subbands include a third subband, the first subdata includes third subdata, and the third subdata corresponds to the third subband. To be specific, when LBT is performed successfully on all the subbands occupied by the first time-frequency resource, the third subdata is sent by using the resource occupied by the first time-frequency resource in the third subband. In one embodiment, a priority of the third subdata is lower than that of the second subdata. When the K subbands include the second subband and the third subband, and do not include the first subband, the first device maps the first subdata to the second subband, and the first device maps the second subdata to the third subband.

In the case 3, in another implementation, the K subbands include a third subband, the first subdata includes third subdata, and the third subdata corresponds to the third subband. To be specific, when LBT is performed successfully on all the subbands occupied by the first time-frequency resource, the third subdata is sent by using the resource occupied by the first time-frequency resource in the third subband. In one embodiment, a priority of the third subdata is lower than that of the second subdata. When the K subbands include the second subband and the third subband, and do not include the first subband, the first device maps the first subdata to the third subband, and the first device maps the second subdata to the second subband.

In the case 3, in another implementation, the first device discards the second subdata.

In one embodiment, the first TB includes one CB. The first subdata includes high-priority data obtained after the code block is encoded. The second subdata includes low-priority data obtained after the code block is encoded. The high-priority data includes data formed by continuous bit streams output first after the code block is encoded. The low-priority data includes data formed by continuous bit streams output subsequently after the code block is encoded. Refer to related descriptions in the previous embodiment for specifically obtaining the high-priority data and the low-priority data and an example.

In one embodiment, when the first TB includes at least a first CBG and a second CBG, the first code block group and the second code block group both include at least one code block, and the first subdata may be divided in two manners.

Manner 1: The first subdata includes data obtained after the first CBG is encoded and does not include data obtained after the second CBG is encoded, and the second subdata includes the data obtained after the second CBG is encoded and does not include the data obtained after the first CBG is encoded. When only some of the at least two subbands occupied by the first time-frequency resource can be used, the first device discards data corresponding to subbands that cannot be used. Because a CBG is mapped to a subband, it can be ensured that a transmitted CBG may be correctly received by a receiving end. Further in one embodiment, only discarded data is retransmitted during retransmission, so that transmission efficiency can be improved.

In one embodiment, if the K subbands include the first subband and do not include the second subband, the sending, by the first device, the first data by using the second time-frequency resource includes:

sending, by the first device, the first subdata by using the first subband occupied by the second time-frequency resource;

and/or, if the K subbands include the second subband and do not include the first subband, the sending, by the first device, the first data by using the second time-frequency resource includes:

sending, by the first device, the second subdata by using the second subband occupied by the second time-frequency resource; or, sending, by the first device, the first subdata by using the second subband occupied by the second time-frequency resource, where the second subband is further used to send control information or data of URLLC.

Refer to related descriptions in Embodiment 1 for the first data, the first time-frequency resource, the first subdata, the second subdata, and methods for mapping and sending the first subdata and the second subdata. Details are not described herein again.

Manner 2: The first subdata includes data obtained after the first CBG is encoded and data obtained after the second CBG is encoded, and the second subdata also includes the data obtained after the first CBG is encoded and the data obtained after the second CBG is encoded. Both the first code block group and the second code block group include at least one code block. In one embodiment, the first subdata includes first high-priority data obtained after the first code block group is encoded and second high-priority data obtained after the second code block group is encoded. The second subdata includes first low-priority data obtained after the first code block group is encoded and second low-priority data obtained after the second code block group is encoded. The first high-priority data includes data formed by continuous bit streams output first after the first code block group is encoded. The first low-priority data includes data formed by continuous bit streams output subsequently after the first code block group is encoded. The second high-priority data includes data formed by continuous bit streams output first after the second code block group is encoded. The second low-priority data includes data formed by continuous bit streams output subsequently after the second code block group is encoded.

Further in one embodiment, system bits in the data that is obtained after the first CBG is encoded and that is included in the first subdata are more than system bits in the data that is obtained after the first CBG is encoded and that is included in the second subdata; and/or, system bits in the data that is obtained after the second CBG is encoded and that is included in the first subdata are more than system bits in the data that is obtained after the second CBG is encoded and that is included in the second subdata. In other words, a priority of the first subdata is higher than that of the second subdata. The first device performs channel detection on the at least two subbands occupied by the first time-frequency resource, to determine, from the at least two subbands, at least one subband that can be used by the first device, the at least one subband includes the second subband, and the at least one subband does not include the first subband. In this case, the first device maps the first subdata to the second subband, to ensure that information of a high priority or high importance is transmitted.

A manner of dividing the first subdata and the second subdata in the foregoing manner 1 and manner 2 is similar to the manner of dividing the first subdata and the second subdata in the previous embodiment. Refer to related descriptions in the previous embodiment for details.

Refer to related descriptions in Embodiment 1 for service or information types corresponding to the at least two CBGs in the foregoing manner 1 and manner 2. Details are not described herein again.

The first device may perform communication transmission in the manner 1 or the manner 2. Use of the manner 1 or the manner 2 is specified by a communications system, or configured by a network device by using higher layer signaling, or indicated by the network device by using physical layer signaling.

In one embodiment, a quantity of available resources in the first subband is the same as a quantity of available resources in the second subband. Alternatively, a signal structure in the first subband is the same as a signal structure in the second subband. Alternatively, a manner of mapping a signal to the first subband is the same as a manner of mapping a signal to the second subband.

It should be understood that, that the device maps the subdata to the subbands may be that the device maps some or all of data in the subdata to the subbands. For example, that the first device maps the first subdata to the first subband may be that: the first device maps some of data in the first subdata to the first subband, or the first device maps all of data in the first subdata to the first subband. Correspondingly, that the first device sends the first subdata by using the first subband occupied by the first time-frequency resource may be that: the first device sends some of data in the first subdata by using the first subband occupied by the first time-frequency resource, or the first device sends all of data in the first subdata by using the first subband occupied by the first time-frequency resource. Descriptions of same or similar cases are omitted below to avoid repetition.

By way of example and not limitation, this embodiment of the present disclosure is described below by using an example in which a quantity of subbands occupied by the first time-frequency resource scheduled by the network device is N, and a quantity of subbands that can be used and that are determined by the first device through channel detection is K. N is a positive integer greater than or equal to 2, and K is a positive integer greater than or equal to 1.

The first data includes N pieces of subdata. The N pieces of subdata are respectively $S_1, S_2, \ldots, S_N$, and the N pieces of subdata are correspondingly mapped to N subbands. A start location of each of the N pieces of subdata is specified by the communications system; or, the start location of each of the N pieces of subdata corresponds to a start location of an RV version; or a start location of an nth piece of subdata in the N pieces of subdata and an end location of an (n−1)th piece of subdata in the N pieces of subdata are continuous; or, start locations of the N pieces of subdata are all the same.

When K=N, that is, when the first device determines, through channel detection, that resources in the N subbands occupied by the first time-frequency resource can all be used, data mapped to the K subbands is respectively $S_1, S_2, \ldots, S_N$; or in other words, data mapped to the N subbands is respectively $S_1, S_2, \ldots, S_N$. Specifically, $S_1$ is mapped to a subband 1, $S_2$ is mapped to a subband 2, . . . , and $S_N$ is mapped to a subband N.

When 1≤K<N, that is, when the first device determines, through channel detection, that resources in the K subbands in the N subbands occupied by the first time-frequency resource can all be used, data mapped to the K subbands is respectively $S_1, S_2, \ldots, S_K$. The data may be sent and mapped in ascending (or descending) order of indexes in the K subbands. For example, N=4, K=3, and the K subbands are respectively a subband 1, a subband 3, and a subband 4. The first device maps $S_1$ to the subband 1, maps $S_2$ to the subband 3, and maps $S_3$ to the subband 4 in a mapping sequence, that is, ascending order of indexes of the subbands. An advantage of this is that, for some encoding manners, such as LPCD coding, sent or received bits output after a transport block is encoded are required to be continuous, so that a receiving device has a higher probability of performing decoding correctly. Alternatively, when the K subbands do not include the first subband, $S_1$ is sent by using a subband with a largest (or smallest) index in the K subbands, and mapping in other subbands keeps unchanged. For example, N=4, K=3, and the K subbands are respectively the subband 2, the subband 3, and the subband 4. The first device sends $S_1$ by using the subband with the largest index in the three subbands, and mapping in other subbands keeps unchanged. In other words, $S_1$ is mapped to the subband 4, $S_2$ is mapped to the subband 2, and $S_3$ is mapped to the subband 3. An advantage of this is that, when the receiving device determines, in a manner of reference signal blind detection, a subband actually used by the sending device, a probability that the sending device and the receiving device incorrectly understand a matching relationship between resources in the subbands and the data can be reduced.

In one embodiment, when 1≤K<N (or in other words, resources actually used for sending data by the first device are fewer than resources planned to be used for sending data), a matching relationship or a mapping relationship between subdata and subbands may be predefined, or may be notified by the first device to the second device by using signaling, or may be notified by the network device to the terminal device by using signaling. This is not limited in the present disclosure.

In one embodiment, when at least one piece of subdata in $S_1, S_2, \ldots, S_N$ includes bits obtained after the control information is encoded, a quantity of resources used to transmit the bits obtained after the control information is encoded is determined based on a time domain resource and/or a frequency domain resource in the first time-frequency resource (or in other words, a resource occupied by the first time-frequency resource in N subbands).

In one embodiment, when at least one piece of subdata in $S_1, S_2, \ldots, S_N$ includes the bits obtained after the control information is encoded, the quantity of resources used to transmit the bits obtained after the control information is encoded is determined based on a time domain resource and/or a frequency domain resource in the second time-frequency resource (or in other words, a resource occupied by the first time-frequency resource in K subbands).

Figure 13:
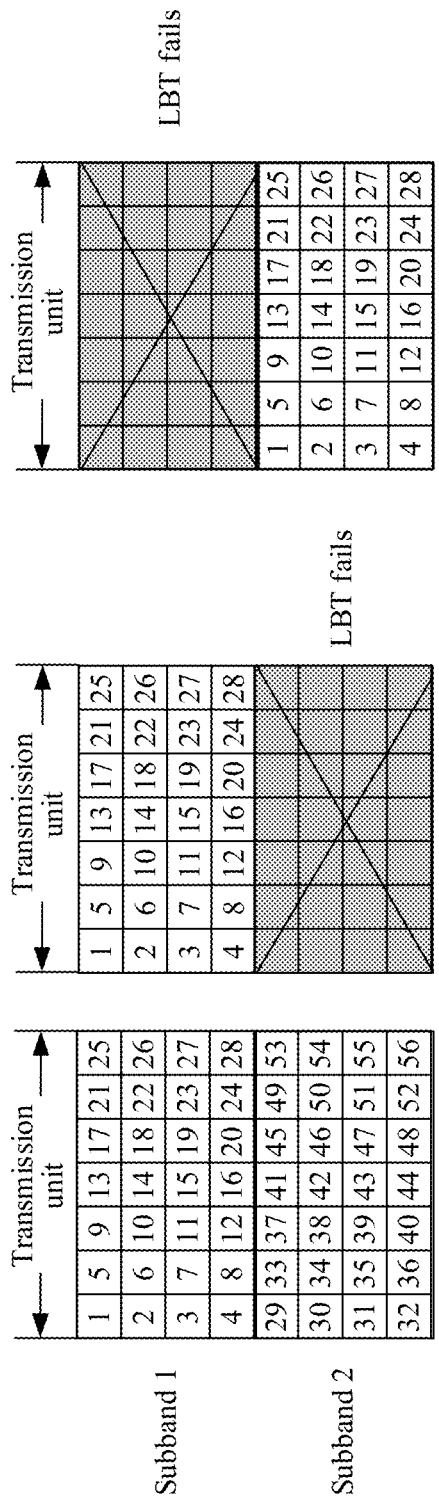
FIG. 13 is a schematic diagram of a data mapping method based on subbands according to the present disclosure.
Figure 14:
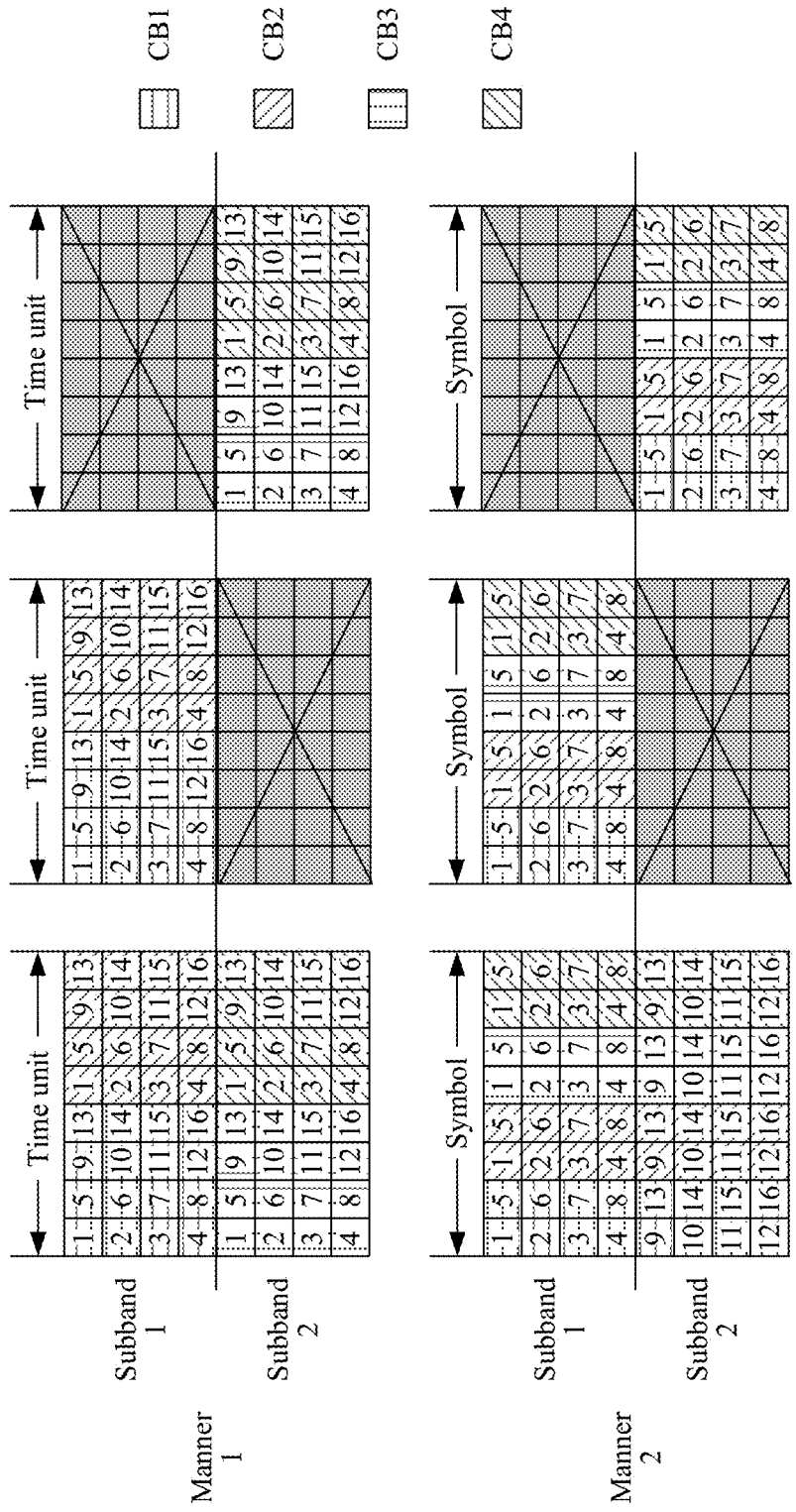
FIG. 14 is a schematic diagram of another data mapping method based on subbands according to the present disclosure.

When N=2, FIG. 13 and FIG. 14 respectively provide schematic diagrams of mapping when K=2 and K=1.

As shown in FIG. 13, the first time-frequency resource occupies the subband 1 and the subband 2. The first time-frequency resource occupies, in the subband 1, seven symbols in time domain, four subcarriers in frequency domain, and a total of 28 resource elements RE. The first time-frequency resource occupies, in the subband 2, seven symbols in time domain, four subcarriers in frequency domain, and a total of 28 REs. Sequence numbers corresponding to data included in the first subdata are 1 to 28, and sequence numbers corresponding to data included in the second subdata are 29 to 56, where sequence numbers corresponding to data indicate mapping sequences. The data included in the first subdata or the second subdata may be symbols after modulation (for example, QPSK modulation, 16QAM modulation, 64QAM modulation, or 256QAM modulation), or bits obtained after encoding and before modulation, or symbols after DFT modulation. This is not limited in the present disclosure.

To facilitate describing priorities of different subdata, it is assumed that the first transport block includes at least one of a transport block 1, a transport block 2, and a transport block 3. The transport block 1 is a control information transport block. The transport block 2 is a URLLC transport block. The transport block 3 is a transport block of a data service. The transport block 1, the transport block 2, or the transport block 3 each includes at least one transport block.

In one embodiment, the first subdata and the second subdata include bits obtained after a transport block, for example, the transport block 1 (or the transport block 2, or the transport block 3) is encoded. The first subdata includes data formed by continuous bit streams output first after the transport block 1 (or the transport block 2, or the transport block 3) is encoded. The second subdata includes data formed by continuous bit streams output subsequently after the transport block 1 (or the transport block 2, or the transport block 3) is encoded.

In one embodiment, the first subdata includes bits obtained after the transport block 1 (and/or the transport block 2) are/is encoded, and the second subdata includes bits obtained after the transport block 3 is encoded.

In one embodiment, the first subdata includes the bits obtained after the transport block 1 (and/or the transport block 2) are/is encoded and data formed by continuous bit streams output first after the transport block 3 is encoded, and the second subdata includes data formed by continuous bit streams output subsequently after the transport block 3 is encoded.

In one embodiment, the first subdata includes data formed by continuous bit streams output first after the transport block 1 is encoded, and/or data formed by continuous bit streams output first after the transport block 2 is encoded, and/or data formed by continuous bit streams output first after the transport block 3 is encoded; and the second subdata includes data formed by continuous bit streams output subsequently after the transport block 1 is encoded, and/or data formed by continuous bit streams output subsequently after the transport block 2 is encoded, and/or data formed by continuous bit streams output subsequently after the transport block 3 is encoded.

In one embodiment, the first subdata includes the bits obtained after the transport block 2 is encoded, and the second subdata includes the bits obtained after the transport block 1 is encoded.

In one embodiment, the first subdata includes the bits obtained after the transport block 1 is encoded, and the second subdata includes the bits obtained after the transport block 2 is encoded.

In one embodiment, when determining, through channel detection, that the subband 1 and the subband 2 can be used, the first device maps the first subdata to the subband 1, and maps the second subdata to the subband 2; or in other words, the first device sends the first subdata by using the subband 1, and sends the second subdata by using the subband 2. In one embodiment, the first device maps the first subdata to the subband 1 in a first-frequency-then-time sequence. In one embodiment, the first device maps the second subdata to the subband 2 in a first-frequency-then-time sequence.

In one embodiment, when determining, through channel detection, that the subband 1 can be used but the subband 2 cannot be used, the first device maps the first subdata to the subband 1, or in other words, the first device sends the first subdata by using the subband 1. In one embodiment, the first device maps the first subdata to the subband 1 in a first-frequency-then-time sequence. In one embodiment, the first device discards the second subdata.

In one embodiment, when determining, through channel detection, that the subband 2 can be used but the subband 1 cannot be used, the first device maps the first subdata to the subband 2, or in other words, the first device sends the first subdata by using the subband 2. In one embodiment, the first device maps the first subdata to the subband 2 in a first-frequency-then-time sequence. In one embodiment, the first device discards the second subdata. In one embodiment, a manner of mapping the first subdata to the subband 2 by the first device is the same as a manner of mapping the first subdata to the subband 1 by the first device when the subband 1 can be used.

In one embodiment, when the first subdata or the second subdata includes the bits obtained after the transport block 1 (or in other words, control information) is encoded, a quantity of resources used to transmit the bits obtained after the control information is encoded is determined based on a time domain resource and/or a frequency domain resource in the first time-frequency resource.

In one embodiment, when the first subdata or the second subdata includes the bits obtained after the transport block 1 (or in other words, the control information) is encoded, the quantity of resources used to transmit the bits obtained after the control information is encoded is determined based on a time domain resource and/or a frequency domain resource in the second time-frequency resource.

By way of example and not limitation, this embodiment of the present disclosure is described below by using an example in which the quantity of subbands occupied by the first time-frequency resource scheduled by the network device is 2, the first TB includes two CBGs, and each CBG includes two CBs.

As shown in FIG. 14, the first TB includes four CBs, respectively a CB 1 to a CB 4. The CB1 and the CB2 belong to a CBG 1, and the CB 3 and the CB 4 belong to a CBG 2. For ease of description, sequence numbers corresponding to data obtained after the CB 1, the CB 2, the CB 3, or the CB 4 is encoded are respectively 1 to 16. The first time-frequency resource occupies the subband 1 and the subband 2. The first time-frequency resource occupies, in the subband 1, eight symbols in time domain, four subcarriers in frequency domain, and a total of 32 resource elements RE. The first time-frequency resource occupies, in the subband 2, eight symbols in time domain, four subcarriers in frequency domain, and a total of 32 REs. Numbers 1, 2, . . . indicate mapping sequences of encoded and modulated symbols in subbands.

In one embodiment, priorities of the CBG 1 and the CBG 2 are the same. By way of example and not limitation, the CB 1, the CB 2, the CB 3, and the CB 4 are CBs of a same type of data (for example, control information, a data service, or URLLC data). That is, there is no priority among the CB 1, the CB 2, the CB 3, and the CB 4.

In one embodiment, the priority of the CBG 1 is higher than that of the CBG 2. By way of example and not limitation, the CB 1 in the CBG 1 is a CB of the control information, and a remaining CB is a CB of the data service. When the priority of the control information is higher than that of the service data, in this case, it may be considered that the priority of the CBG 1 is higher than that of the CBG 2.

Manner 1

The first subdata includes data obtained after the CBG 1 is encoded, and the second subdata includes data obtained after the CBG 2 is encoded.

As shown in the manner 1 of FIG. 14, in one embodiment, when determining, through channel detection, that the subband 1 and the subband 2 can be used, the first device maps the first subdata to the subband 1, and maps the second subdata to the subband 2; or in other words, the first device sends, by using the subband 1, the data obtained after the CBG 1 is encoded, and sends, by using the subband 2, the data obtained after the CBG 2 is encoded. In one embodiment, the first device maps, in a first-frequency-then-time sequence, the data obtained after the CBG 1 is encoded to the subband 1. In one embodiment, the first device maps, in a first-frequency-then-time sequence, the data obtained after the CBG 2 is encoded to the subband 2. In one embodiment, in a process of mapping a CBG to a subband, the first device may first map data obtained after one CB in the CBG is encoded, and then map data obtained after the other CB in the CBG is encoded.

As shown in the manner 1 of FIG. 14, in one embodiment, when determining, through channel detection, that the subband 1 can be used but the subband 2 cannot be used, the first device maps the first subdata to the subband 1, or in other words, the first device sends, by using the subband 1, the data obtained after the CBG 1 is encoded. In one embodiment, the first device discards the second subdata. In one embodiment, the first device maps, in a first-frequency-then-time sequence, the data obtained after the CBG 1 is encoded to the subband 1. In one embodiment, in a process of mapping the CBG 1 to a subband, the first device may first map data obtained after one CB in the CBG 1 is encoded, and then map data obtained after the other CB in the CBG 1 is encoded.

As shown in the manner 1 of FIG. 14, in one embodiment, when determining, through channel detection, that the subband 2 can be used but the subband 1 cannot be used, the first device maps the second subdata to the subband 2, or in other words, the first device sends, by using the subband 2, the data obtained after the CBG 2 is encoded. In one embodiment, the first device discards the first subdata. In one embodiment, the first device maps, in a first-frequency-then-time sequence, the data obtained after the CBG 2 is encoded to the subband 2. In one embodiment, in a process of mapping the CBG 2 to a subband, the first device may first map data obtained after one CB in the CBG 2 is encoded, and then map data obtained after the other CB in the CBG 2 is encoded.

In one embodiment, when determining, through channel detection, that the subband 2 can be used but the subband 1 cannot be used, the first device maps the first subdata to the subband 2, or in other words, the first device sends, by using the subband 2, the data obtained after the CBG 1 is encoded. The priority of the CBG 1 is higher than that of the CBG 2. In one embodiment, the first device discards the second subdata. In one embodiment, the first device maps, in a first-frequency-then-time sequence, the data obtained after the CBG 1 is encoded to the subband 2. In one embodiment, in a process of mapping the CBG 1 to a subband, the first device may first map data obtained after one CB in the CBG 1 is encoded, and then map data obtained after the other CB in the CBG 1 is encoded. In one embodiment, a manner of mapping the first subdata to the subband 2 by the first device is the same as a manner of mapping the first subdata to the subband 1 by the first device when the subband 1 can be used.

In one embodiment, when the first subdata or the second subdata includes bits obtained after the control information is encoded, a quantity of resources used to transmit the bits obtained after the control information is encoded is determined based on a time domain resource and/or a frequency domain resource in the first time-frequency resource.

In one embodiment, when the first subdata or the second subdata includes the bits obtained after the control information is encoded, the quantity of resources used to transmit the bits obtained after the control information is encoded is determined based on a time domain resource and/or a frequency domain resource in the second time-frequency resource.

In one embodiment, in the manner 1, the CBG 1 is mapped to a first subband (that is, a BP 1 or the subband 1), and the CBG 2 is mapped to a second subband (that is, a BP 2, or the subband 2). When LBT performed on the first subband fails, and LBT performed on the second subband succeeds, the first device discards the CBG 1, and sends the CBG 2 only on the second subband.

Manner 2

The first subdata includes data formed by continuous bit streams output first after the CBG 1 and the CBG 2 are encoded. The second subdata includes data formed by continuous bit streams output subsequently after the CBG 1 and the CBG 2 are encoded.

As shown in the manner 2 of FIG. 14, in one embodiment, when determining, through channel detection, that the subband 1 and the subband 2 can be used, the first device maps the first subdata to the subband 1, and maps the second subdata to the subband 2; or in other words, the first device sends, by using the subband 1, the data formed by continuous bit streams output first after the CBG 1 and the CBG 2 are encoded, and sends, by using the subband 2, the data formed by continuous bit streams output subsequently after the CBG 1 and the CBG 2 are encoded. In one embodiment, the first device maps modulation symbols corresponding to the data formed by the continuous bit streams output first after the CBG 1 and the CBG 2 are encoded to the subband 1 in a first-frequency-then-time sequence. In one embodiment, the first device maps modulation symbols corresponding to the data formed by the continuous bit streams output subsequently after the CBG 1 and the CBG 2 are encoded to the subband 2 in a first-frequency-then-time sequence. In one embodiment, in a process of mapping a CBG to a subband, the first device may first map data obtained after one CB in the CBG is encoded, and then map data obtained after the other CB in the CBG is encoded. In one embodiment, in a process of mapping a plurality of CBGs to subbands, the first device may first map data in one CBG, and then map data in another CBG.

As shown in the manner 2 of FIG. 14, in one embodiment, when determining, through channel detection, that the subband 1 can be used but the subband 2 cannot be used, the first device maps the first subdata to the subband 1, or in other words, the first device sends, by using the subband 1, the data formed by the continuous bit streams output first after the CBG 1 and the CBG 2 are encoded. In one embodiment, the first device discards the second subdata. In one embodiment, the first device maps the modulation symbols corresponding to the data formed by the continuous bit streams output first after the CBG 1 and the CBG 2 are encoded to the subband 1 in a first-frequency-then-time sequence. In one embodiment, in a process of mapping a CBG to a subband, the first device may first map data obtained after one CB in the CBG is encoded, and then map data obtained after the other CB in the CBG is encoded. In one embodiment, in a process of mapping a plurality of CBGs to subbands, the first device may first map data in one CBG, and then map data in another CBG.

As shown in the manner 2 of FIG. 14, in one embodiment, when determining, through channel detection, that the subband 2 can be used but the subband 1 cannot be used, the first device maps the first subdata to the subband 2, or in other words, the first device sends, by using the subband 2, the data formed by the continuous bit streams output first after the CBG 1 and the CBG 2 are encoded. In one embodiment, the first device discards the second subdata. In one embodiment, the first device maps the modulation symbols corresponding to the data formed by the continuous bit streams output first after the CBG 1 and the CBG 2 are encoded to the subband 2 in a first-frequency-then-time sequence. In one embodiment, in a process of mapping a CBG to a subband, the first device may first map data obtained after one CB in the CBG is encoded, and then map data obtained after the other CB in the CBG is encoded. In one embodiment, in a process of mapping a plurality of CBGs to subbands, the first device may first map data in one CBG, and then map data in another CBG. In one embodiment, a manner of mapping the first subdata to the subband 2 by the first device is the same as a manner of mapping the first subdata to the subband 1 by the first device when the subband 1 can be used.

In one embodiment, when the first subdata or the second subdata includes the bits obtained after the control information is encoded, the quantity of resources used to transmit the bits obtained after the control information is encoded is determined based on the time domain resource and/or the frequency domain resource in the first time-frequency resource.

In one embodiment, when the first subdata or the second subdata includes the bits obtained after the control information is encoded, the quantity of resources used to transmit the bits obtained after the control information is encoded is determined based on the time domain resource and/or the frequency domain resource in the second time-frequency resource.

In one embodiment, in the manner 2, the CBG 1 and the CBG 2 are respectively mapped to the first subband and the second subband. System bits of each CB in the CBG 1 and the CBG 2 included in the first subdata are more than system bits of each CB in the CBG 1 and the CBG 2 included in the second subdata. When LBT performed on the first subband fails, and LBT performed on the second subband succeeds, the first device maps the first subdata originally planned to be mapped to the first subband to the second subband, and discards the second subdata. A manner of mapping the first subdata to the second subband is the same as a manner of mapping the first subdata to the first subband. A quantity of available resources in the first subband are the same as that of available resources in the second subband.

In this embodiment, if a sending device successfully performs LBT only on some subbands, and preferentially transmits data of a high priority or system information bits during subband transmission, transmission of important data (that is, the data of a high priority) can be ensured, or decoding performance of a receiving side is improved.

Corresponding to the foregoing method, the present disclosure provides a data sending apparatus. The data sending apparatus may be the first device in the foregoing method embodiment, and is configured to send data to the second device, and may also be referred to as a sending device or a sending end. The data sending apparatus may perform the operations in the foregoing embodiment.

Figure 15:
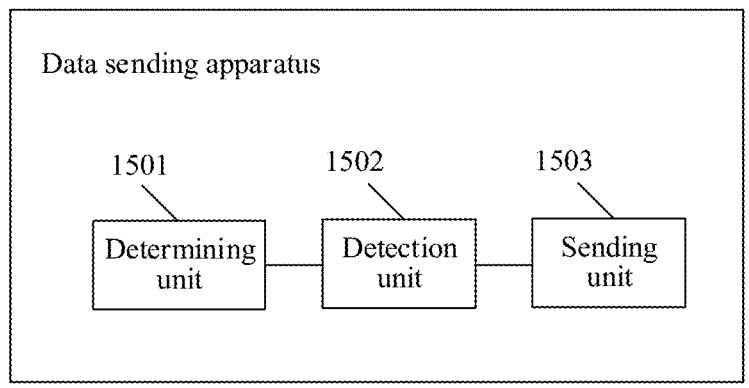
FIG. 15 is a schematic structural diagram of an embodiment of a data sending apparatus according to the present disclosure.

Referring to FIG. 15, in an embodiment, the data sending apparatus includes:

a determining unit 1501, configured to determine a first time-frequency resource used to transmit first data, where the first time-frequency resource occupies at least two subbands in frequency domain, the at least two subbands include a first subband and a second subband, and the first data is data obtained after a first transport block is encoded;

a detection unit 1502, configured to determine, from the first time-frequency resource, a second time-frequency resource that can be used, where the second time-frequency resource occupies K of the at least two subbands in frequency domain, K≥1; and a sending unit 1503, configured to send the first data by using the second time-frequency resource.

In an implementation, the first data includes at least two pieces of subdata, and the at least two pieces of subdata include first subdata and second subdata; and if the K subbands include the first subband and the second subband, the sending unit is configured to: send the first subdata by using the first subband occupied by the second time-frequency resource, and send the second subdata by using the second subband occupied by the second time-frequency resource.

In an implementation, the first data includes at least two pieces of subdata, and the at least two pieces of subdata include first subdata and second subdata;

if the K subbands include the first subband and do not include the second subband, the sending unit is configured to send the first subdata by using the first subband occupied by the second time-frequency resource; and/or, if the K subbands include the second subband and do not include the first subband, the sending unit is configured to send the first subdata by using the second subband occupied by the second time-frequency resource.

In an implementation, if the K subbands include the second subband and do not include the first subband, the first device discards the second subdata; or, the sending unit is configured to send the second subdata by using the third subband occupied by the second time-frequency resource.

In an implementation, the first data includes the at least two pieces of subdata, and the at least two pieces of subdata include the first subdata and the second subdata; the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In an implementation, if the K subbands include the first subband and do not include the second subband, the sending unit is configured to send the first subdata by using the first subband occupied by the second time-frequency resource; and/or if the K subbands include the second subband and do not include the first subband, the sending unit is configured to send the second subdata by using the second subband occupied by the second time-frequency resource; or, the sending unit is configured to send the first subdata by using the second subband occupied by the second time-frequency resource, where the first subdata further includes control information or data of URLLC.

In an implementation, the sending unit is further configured to send at least one type of the following information by using the second time-frequency resource:

the control information; and the data of the URLLC.

Refer to related descriptions in Embodiment 1 for the first data, the first time-frequency resource, the first subdata, the second subdata, and methods for mapping and sending the first subdata and the second subdata.

The data sending apparatus may be the first device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

Corresponding to the foregoing method, the present disclosure provides a data receiving apparatus. The data receiving apparatus may be the second device in the foregoing method embodiment, and is configured to receive data from the first device, and may also be referred to as a receiving device or a receiving end. The data receiving apparatus may perform the operations in the foregoing embodiment.

Figure 16:
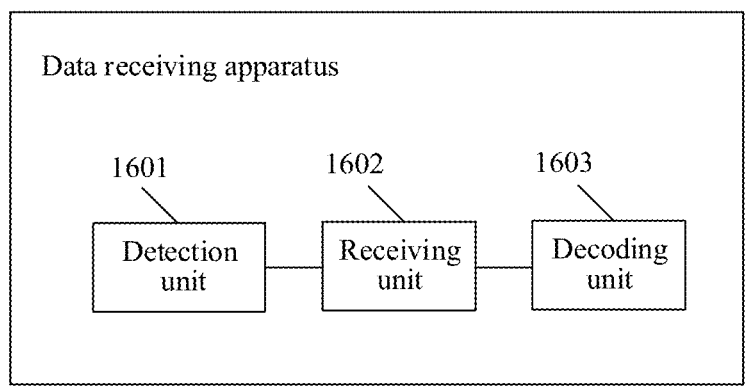
FIG. 16 is a schematic structural diagram of an embodiment of a data receiving apparatus according to the present disclosure.

Referring to FIG. 16, in an embodiment, the data receiving apparatus includes:

a detection unit 1601, configured to determine, from a first time-frequency resource, a second time-frequency resource used to receive data, where the first time-frequency resource occupies at least two subbands in frequency domain, and the second time-frequency resource occupies K of the at least two subbands in frequency domain, K≥1;

a receiving unit 1602, configured to receive the first data on the K subbands occupied by the second time-frequency resource; and a decoding unit 1603, configured to decode the first data to obtain a first transport block (TB).

In an implementation, the at least two subbands include a first subband and a second subband, the first data includes at least two pieces of subdata, and the at least two pieces of subdata include first subdata and second subdata; and if the K subbands include the first subband and the second subband, the receiving unit is configured to: receive the first subdata by using the first subband occupied by the second time-frequency resource, and receive the second subdata by using the second subband occupied by the second time-frequency resource.

In an implementation, the at least two subbands include the first subband and the second subband, the first data includes the at least two pieces of subdata, and the at least two pieces of subdata include the first subdata and the second subdata, where if the K subbands include the first subband and do not include the second subband, the receiving unit is configured to receive the first subdata by using the first subband occupied by the second time-frequency resource; and/or, if the K subbands include the second subband and do not include the first subband, the receiving unit is configured to receive the first subdata by using the second subband occupied by the second time-frequency resource.

In an implementation, if the K subbands include the second subband and do not include the first subband, the K subbands further include a third subband, and the receiving unit is further configured to receive the second subdata by using the third subband occupied by the second time-frequency resource.

In an implementation, the at least two subbands include the first subband and the second subband, the first data includes the at least two pieces of subdata, and the at least two pieces of subdata include the first subdata and the second subdata; and the first transport block includes at least a first code block group and a second code block group, the first subdata includes data obtained after the first code block group is encoded and does not include data obtained after the second code block group is encoded, and the second subdata includes the data obtained after the second code block group is encoded and does not include the data obtained after the first code block group is encoded.

In an implementation, if the K subbands include the first subband and do not include the second subband, the receiving unit is configured to receive the first subdata by using the first subband occupied by the second time-frequency resource;

and/or, if the K subbands include the second subband and do not include the first subband, the receiving unit is configured to receive the second subdata by using the second subband occupied by the second time-frequency resource; or, the receiving unit is configured to receive the first subdata by using the second subband occupied by the second time-frequency resource, where the first subdata further includes control information or data of URLLC.

In an implementation, the receiving unit is further configured to receive at least one type of the following information by using the K subbands occupied by the second time-frequency resource:

the control information; and the data of the URLLC.

Refer to related descriptions in Embodiment 1 for the first data, the first time-frequency resource, the first subdata, the second subdata, and methods for mapping and sending the first subdata and the second subdata.

The data receiving apparatus may be the second device in the foregoing method embodiment, that is, an access network device or a terminal device.

It should be noted that content such as information exchange between the modules/units of the apparatus and the execution processes thereof is based on the same idea as the method embodiments of the present disclosure, and produces the same technical effects as the method embodiments of the present disclosure. For the specific content, refer to the foregoing description in the method embodiments of the present disclosure, and the details are not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A data sending method, comprising:

determining, by a first device, a first time-frequency resource used to transmit first data, wherein the first time-frequency resource occupies at least two subbands in frequency domain, the at least two subbands comprise a first subband and a second subband, and the first data is data obtained after a first transport block is encoded;

determining, by the first device from the first time-frequency resource, a second time-frequency resource that can be used by the first device, wherein the second time-frequency resource occupies K of the at least two subbands in frequency domain, K≥1; and sending, by the first device, the first data by using the second time-frequency resource, wherein the first data comprises at least two pieces of subdata, and the at least two pieces of subdata comprise first subdata and second subdata; the first transport block comprises at least a first code block group and a second code block group, the first subdata comprises data obtained after the first code block group is encoded and does not comprise data obtained after the second code block group is encoded, and the second subdata comprises the data obtained after the second code block group is encoded and does not comprise the data obtained after the first code block group is encoded.

2. The method according to claim 1, wherein the first data comprises at least two pieces of subdata, and the at least two pieces of subdata comprise first subdata and second subdata; if the K subbands comprise the first subband and the second subband, the sending, by the first device, the first data by using the second time-frequency resource comprises:

sending, by the first device, the first subdata by using the first subband occupied by the second time-frequency resource, and sending, by the first device, the second subdata by using the second subband occupied by the second time-frequency resource.

3. The method according to claim 1, wherein the first data comprises at least two pieces of subdata, and the at least two pieces of subdata comprise first subdata and second subdata;

if the K subbands comprise the first subband and do not comprise the second subband, the sending, by the first device, the first data by using the second time-frequency resource comprises:

sending, by the first device, the first subdata by using the first subband occupied by the second time-frequency resource; and/or, if the K subbands comprise the second subband and do not comprise the first subband, the sending, by the first device, the first data by using the second time-frequency resource comprises:

sending, by the first device, the first subdata by using the second subband occupied by the second time-frequency resource.

4. The method according to claim 1, wherein if the K subbands comprise the first subband and do not comprise the second subband, the sending, by the first device, the first data by using the second time-frequency resource comprises:

sending, by the first device, the first subdata by using the first subband occupied by the second time-frequency resource;

and/or, if the K subbands comprise the second subband and do not comprise the first subband, the sending, by the first device, the first data by using the second time-frequency resource comprises:

sending, by the first device, the second subdata by using the second subband occupied by the second time-frequency resource; or, sending, by the first device, the first subdata by using the second subband occupied by the second time-frequency resource, wherein the first subdata further comprises control information or data of uplink ultra reliable low latency communication (URLLC).

5. A data receiving method, comprising:

determining, by a second device from a first time-frequency resource, a second time-frequency resource used by the second device to receive first data, wherein the first time-frequency resource occupies at least two subbands in frequency domain, and the second time-frequency resource occupies K of the at least two subbands in frequency domain, K≥1;

receiving, by the second device, the first data on the K subbands occupied by the second time-frequency resource; and decoding, by the second device, the first data, to obtain a first transport block (TB), wherein the at least two subbands comprise a first subband and a second subband, the first data comprises at least two pieces of subdata, and the at least two pieces of subdata comprise first subdata and second subdata; the first transport block comprises at least a first code block group and a second code block group, the first subdata comprises data obtained after the first code block group is encoded and does not comprise data obtained after the second code block group is encoded, and the second subdata comprises the data obtained after the second code block group is encoded and does not comprise the data obtained after the first code block group is encoded.

6. The method according to claim 5, wherein the first data comprises at least two pieces of subdata, and the at least two pieces of subdata comprise first subdata and second subdata; and if the K subbands comprise the first subband and the second subband, the receiving, by the second device, the first data on the K subbands occupied by the second time-frequency resource comprises:

receiving, by the second device, the first subdata by using the first subband occupied by the second time-frequency resource, and receiving, by the second device, the second subdata by using the second subband occupied by the second time-frequency resource.

7. The method according to claim 5, wherein the first data comprises at least two pieces of subdata, and the at least two pieces of subdata comprise first subdata and second subdata, wherein if the K subbands comprise the first subband and do not comprise the second subband, the receiving, by the second device, the first data on the K subbands occupied by the second time-frequency resource comprises:

receiving, by the second device, the first subdata by using the first subband occupied by the second time-frequency resource; and/or, if the K subbands comprise the second subband and do not comprise the first subband, the receiving, by the second device, the first data on the K subbands occupied by the second time-frequency resource comprises:

receiving, by the second device, the first subdata by using the second subband occupied by the second time-frequency resource.

8. The method according to claim 5, wherein if the K subbands comprise the first subband and do not comprise the second subband, the receiving, by the second device, the first data on the K subbands occupied by the second time-frequency resource comprises:

receiving, by the second device, the first subdata by using the first subband occupied by the second time-frequency resource;

and/or, if the K subbands comprise the second subband and do not comprise the first subband, the receiving, by the second device, the first data on the K subbands occupied by the second time-frequency resource comprises:

receiving, by the second device, the second subdata by using the second subband occupied by the second time-frequency resource; or, receiving, by the second device, the first subdata by using the second subband occupied by the second time-frequency resource, wherein the first subdata further comprises control information or data of uplink ultra reliable low latency communication (URLLC).

9. A data sending apparatus, comprising:
a determining unit, configured to determine a first time-frequency resource used to transmit first data, wherein the first time-frequency resource occupies at least two subbands in frequency domain, the at least two subbands comprise a first subband and a second subband, and the first data is data obtained after a first transport block is encoded;
a detection unit, configured to determine, from the first time-frequency resource, a second time-frequency resource that can be used, wherein the second time-frequency resource occupies K of the at least two subbands in frequency domain, K≥1; and
a sending unit, configured to send the first data by using the second time-frequency resource, wherein the first data comprises at least two pieces of subdata, and the at least two pieces of subdata comprise first subdata and second subdata; the first transport block comprises at least a first code block group and a second code block group, the first subdata comprises data obtained after the first code block group is encoded and does not comprise data obtained after the second code block group is encoded, and the second subdata comprises the data obtained after the second code block group is encoded and does not comprise the data obtained after the first code block group is encoded.

10. The apparatus according to claim 9, wherein the first data comprises at least two pieces of subdata, and the at least two pieces of subdata comprise first subdata and second subdata; and if the K subbands comprise the first subband and the second subband, the sending unit is configured to: send the first subdata by using the first subband occupied by the second time-frequency resource, and send the second subdata by using the second subband occupied by the second time-frequency resource.

11. The apparatus according to claim 9, wherein the first data comprises at least two pieces of subdata, and the at least two pieces of subdata comprise first subdata and second subdata, wherein
if the K subbands comprise the first subband and do not comprise the second subband, the sending unit is configured to send the first subdata by using the first subband occupied by the second time-frequency resource; and/or,
if the K subbands comprise the second subband and do not comprise the first subband, the sending unit is configured to send the first subdata by using the second subband occupied by the second time-frequency resource.

12. The apparatus according to claim 9, wherein if the K subbands comprise the first subband and do not comprise the second subband, the sending unit is configured to send the first subdata by using the first subband occupied by the second time-frequency resource; and/or if the K subbands comprise the second subband and do not comprise the first subband, the sending unit is configured to send the second subdata by using the second subband occupied by the second time-frequency resource; or, the sending unit is configured to send the first subdata by using the second subband occupied by the second time-frequency resource, wherein the first subdata further comprises control information or data of uplink ultra reliable low latency communication (URLLC).

13. A data receiving apparatus, comprising:
a detection unit, configured to determine, from a first time-frequency resource, a second time-frequency resource used to receive data, wherein the first time-frequency resource occupies at least two subbands in frequency domain, and the second time-frequency resource occupies K of the at least two subbands in frequency domain, K≥1;
a receiving unit, configured to receive first data on the K subbands occupied by the second time-frequency resource; and
a decoding unit, configured to decode the first data to obtain a first transport block (TB), wherein the at least two subbands comprise a first subband and a second subband, the first data comprises at least two pieces of subdata, and the at least two pieces of subdata comprise first subdata and second subdata; the first transport block comprises at least a first code block group and a second code block group, the first subdata comprises data obtained after the first code block group is encoded and does not comprise data obtained after the second code block group is encoded, and the second subdata comprises the data obtained after the second code block group is encoded and does not comprise the data obtained after the first code block group is encoded.

14. The apparatus according to claim 13, wherein the first data comprises at least two pieces of subdata, and the at least two pieces of subdata comprise first subdata and second subdata; and if the K subbands comprise the first subband and the second subband, the receiving unit is configured to: receive the first subdata by using the first subband occupied by the second time-frequency resource, and receive the second subdata by using the second subband occupied by the second time-frequency resource.

15. The apparatus according to claim 13, wherein the first data comprises at least two pieces of subdata, and the at least two pieces of subdata comprise first subdata and second subdata, wherein
if the K subbands comprise the first subband and do not comprise the second subband, the receiving unit is configured to receive the first subdata by using the first subband occupied by the second time-frequency resource; and/or,
if the K subbands comprise the second subband and do not comprise the first subband, the receiving unit is configured to receive the first subdata by using the second subband occupied by the second time-frequency resource.

16. The apparatus according to claim 13, wherein if the K subbands comprise the first subband and do not comprise the second subband, the receiving unit is configured to receive the first subdata by using the first subband occupied by the second time-frequency resource;
and/or,
if the K subbands comprise the second subband and do not comprise the first subband, the receiving unit is configured to receive the second subdata by using the second subband occupied by the second time-frequency resource; or, the receiving unit is configured to receive the first subdata by using the second subband occupied by the second time-frequency resource, wherein the first subdata further comprises control information or data of uplink ultra reliable low latency communication (URLLC).

\* \* \* \* \*